(12) United States Patent
Abedini et al.

(10) Patent No.: US 11,405,269 B2
(45) Date of Patent: Aug. 2, 2022

(54) BEAM SWEEP CONFIGURATION FOR FULL DUPLEX CAPABILITY

(71) Applicant: QUALCOMM Incorporated, San Diego, CA (US)

(72) Inventors: Navid Abedini, Basking Ridge, NJ (US); Kapil Gulati, Belle Mead, NJ (US); Andrzej Partyka, Bedminster, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/247,319

(22) Filed: Dec. 7, 2020

(65) Prior Publication Data

US 2021/0194763 A1 Jun. 24, 2021

Related U.S. Application Data

(60) Provisional application No. 62/951,804, filed on Dec. 20, 2019.

(51) Int. Cl.
| | | |
|---|---|---|
| *H04B 7/06* | (2006.01) | |
| *H04L 12/24* | (2006.01) | |
| *H04L 5/14* | (2006.01) | |
| *H04W 56/00* | (2009.01) | |
| *H04L 41/0803* | (2022.01) | |
| *H04L 41/0654* | (2022.01) | |

(52) U.S. Cl.
CPC ....... *H04L 41/0803* (2013.01); *H04B 7/0617* (2013.01); *H04L 5/14* (2013.01); *H04L 41/0654* (2013.01); *H04W 56/001* (2013.01)

(58) Field of Classification Search
CPC .... H04B 7/0617; H04B 7/0695; H04B 7/088; H04B 7/0621; H04L 41/044; H04L 41/0654; H04L 41/0803; H04L 41/0806; H04L 41/12; H04L 5/14; H04L 5/0048; H04W 56/001; H04W 72/048
See application file for complete search history.

(56) References Cited

U.S. PATENT DOCUMENTS

| | | | | |
|---|---|---|---|---|
| 2019/0140811 A1* | 5/2019 | Abedini | ............... | H04B 7/0404 |
| 2020/0059281 A1* | 2/2020 | Grant | ..................... | H04B 7/024 |

FOREIGN PATENT DOCUMENTS

WO 2018172001 9/2018

OTHER PUBLICATIONS

International Search Report and Written Opinion—PCT/US2020/063801—ISA/EPO—dated Mar. 12, 2021.

* cited by examiner

*Primary Examiner* — Melvin C Marcelo
*Assistant Examiner* — Natali Pascual Peguero
(74) *Attorney, Agent, or Firm* — Harrity & Harrity, LLP; Kevin M. Donnelly

(57) ABSTRACT

Various aspects of the present disclosure generally relate to wireless communication. In some aspects, a wireless communication device may determine a full duplex capability of a wireless node for a particular beam pair; select a beam sweep configuration for full duplex communications based at least in part on the full duplex capability of the wireless node for the particular beam pair; and cause communication to occur using the particular beam pair in accordance with the beam sweep configuration based at least in part on selecting the beam sweep configuration. Numerous other aspects are provided.

30 Claims, 14 Drawing Sheets

BEAM SWEEP CONFIGURATION FOR FULL DUPLEX CAPABILITY

CROSS-REFERENCE TO RELATED APPLICATION

This patent application claims priority to U.S. Provisional Patent Application No. 62/951,804, filed on Dec. 20, 2019, entitled "BEAM SWEEP CONFIGURATION FOR FULL DUPLEX CAPABILITY," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for beam sweep configuration for full-duplex-capable wireless nodes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some frequency bands of some communications systems, wireless nodes use beam sweeping procedures to transmit information to other wireless nodes. For example, a first wireless node may transmit a synchronization signal block (SSB) to provide initial access information to another wireless node. In such examples, by using beam sweeping, the first wireless node enables coverage of a wide angular region while using a narrow angular beam. Other examples of beam sweeping communications may include remaining minimum system information (RMSI) transmissions, system information block (SIB) transmissions, random access channel (RACH) transmissions, channel state information reference signal (CSI-RS) transmissions, sounding reference signal (SRS) transmissions, among other examples. Some wireless nodes may have full duplex capability, thereby enabling concurrent transmission and reception in the same frequency. Full duplex capability may improve capacity, reduce latency, reduce resource overhead, among other examples. However, full duplex capability may change over time as a result of changing channel conditions, link budgets, available transmit or receive power, relative position, geographic features (such as during mobility operation), among other examples.

SUMMARY

In some aspects, a method of wireless communication, performed by a wireless communication device, may include determining a full duplex capability of a wireless node for a particular beam pair. The method may include selecting a beam sweep configuration for full duplex communications based at least in part on the full duplex capability of the wireless node for the particular beam pair. The method may include causing communication to occur using the particular beam pair in accordance with the beam sweep configuration based at least in part on selecting the beam sweep configuration.

In some aspects, a wireless communication device for wireless communication may include memory and one or more processors operatively coupled to the memory. The memory and the one or more processors may be configured to determine a full duplex capability of a wireless node for a particular beam pair. The memory and the one or more processors may be configured to select a beam sweep configuration for full duplex communications based at least in part on the full duplex capability of the wireless node for the particular beam pair. The memory and the one or more processors may be configured to cause communication to occur using the particular beam pair in accordance with the beam sweep configuration based at least in part on selecting the beam sweep configuration.

In some aspects, a non-transitory computer-readable medium may store one or more instructions for wireless communication. The one or more instructions, when executed by one or more processors of a wireless communication device, may cause the one or more processors to determine a full duplex capability of a wireless node for a particular beam pair. The one or more instructions, when executed by one or more processors of a wireless communication device, may cause the one or more processors to select a beam sweep configuration for full duplex communications based at least in part on the full duplex capability of the wireless node for the particular beam pair. The one or more instructions, when executed by one or more processors of a wireless communication device, may cause the one or more processors to cause communication to occur using the particular beam pair in accordance with the beam sweep configuration based at least in part on selecting the beam sweep configuration.

In some aspects, an apparatus for wireless communication may include means for determining a full duplex capability of a wireless node for a particular beam pair. The apparatus may include means for selecting a beam sweep configuration for full duplex communications based at least in part on the full duplex capability of the wireless node for the particular beam pair. The apparatus may include means for causing communication to occur using the particular beam pair in accordance with the beam sweep configuration based at least in part on selecting the beam sweep configuration.

In some aspects, a method of wireless communication, performed by a parent wireless node, may include determining a full duplex capability of a child wireless node for a particular beam pair. The method may include selecting a beam sweep configuration for at least one of the parent wireless node or the child wireless node based at least in part on the full duplex capability of the child wireless node for the particular beam pair. The method may include causing communication to occur using the particular beam pair in accordance with the beam sweep configuration based at least in part on selecting the beam sweep configuration.

In some aspects, a parent wireless node for wireless communication may include memory and one or more processors operatively coupled to the memory. The memory and the one or more processors may be configured to determine a full duplex capability of a child wireless node for a particular beam pair. The memory and the one or more processors may be configured to select a beam sweep configuration for at least one of the parent wireless node or the child wireless node based at least in part on the full duplex capability of the child wireless node for the particular beam pair. The memory and the one or more processors may be configured to cause communication to occur using the particular beam pair in accordance with the beam sweep configuration based at least in part on selecting the beam sweep configuration.

In some aspects, a non-transitory computer-readable medium may store one or more instructions for wireless communication. The one or more instructions, when executed by one or more processors of a parent wireless node, may cause the one or more processors to determine a full duplex capability of a child wireless node for a particular beam pair. The one or more instructions, when executed by one or more processors of a wireless communication device, may cause the one or more processors to select a beam sweep configuration for at least one of the parent wireless node or the child wireless node based at least in part on the full duplex capability of the child wireless node for the particular beam pair. The one or more instructions, when executed by one or more processors of a wireless communication device, may cause the one or more processors to cause communication to occur using the particular beam pair in accordance with the beam sweep configuration based at least in part on selecting the beam sweep configuration.

In some aspects, an apparatus for wireless communication may include means for determining a full duplex capability of a child wireless node for a particular beam pair. The apparatus may include means for selecting a beam sweep configuration for at least one of the apparatus or the child wireless node based at least in part on the full duplex capability of the child wireless node for the particular beam pair. The apparatus may include means for causing communication to occur using the particular beam pair in accordance with the beam sweep configuration based at least in part on selecting the beam sweep configuration.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
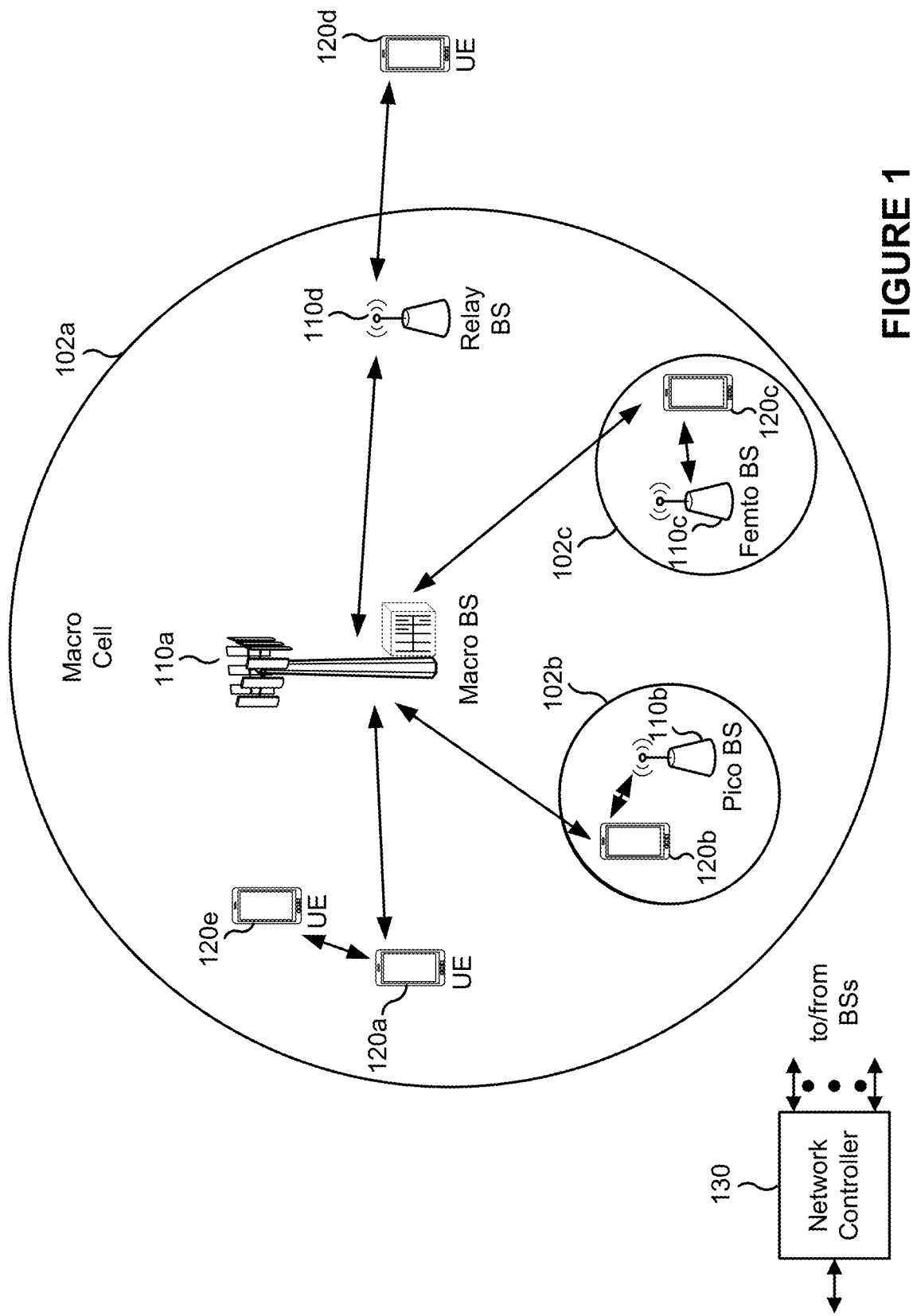
FIG. 1 is a block diagram illustrating an example wireless network in accordance with various aspects of the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

In full duplex operation, a wireless communication device or wireless node (for example, a user equipment (UE), a base station, or an integrated access and backhaul (IAB) node, among other examples) may concurrently transmit and receive using the same frequency or frequency band. For example, a wireless node may transmit a first beam to a parent wireless node on a particular frequency and concurrently receive a second beam from a child wireless node on the same frequency. Similarly, the wireless node may receive a first beam from the parent wireless node while concurrently transmitting a second beam to the child wireless node. Full duplex capabilities may change over time. For example, a wireless node may support full duplex communications on a particular frequency and for a first beam pair at a first time, but may not support full duplex communication on the particular frequency for a second beam pair at a second time.

Various aspects relate generally to a beam sweep configuration for full-duplex-capable wireless nodes. Some aspects more specifically relate to determining a full duplex capability for a particular beam pair and selecting or reselecting a beam sweep configuration for full duplex communications based at least in part on the full duplex capability for the particular beam pair. For example, a first beam sweep configuration, such as a first beam width or beam shape, may be selected when a full duplex capability is configured and a second beam sweep configuration, such as a second beam width or beam shape, may be selected when the full duplex capability is not configured. In some aspects, the particular beam pair may include a transmit beam and a receive beam for communications between two wireless nodes, such as for communications between a parent wireless node and a child wireless node. In some aspects, a wireless communication device or wireless node may determine, when determining the beam sweep configuration, a beam width, a beam shape, a beam direction, a beam order, a set of resources selected for transmission or reception, a periodicity for beam sweeping, a transmit or receive power, among other examples.

Particular aspects of the subject matter described in this disclosure can be implemented to realize one or more of the following potential advantages. In some examples, the described techniques can be used to enable full duplex operation for beam sweeping communications while adapting to changing conditions of the full duplex operation. For example, the wireless node may adapt parameters, such as a beam shape, a beam order, among other examples, to enable full duplex operation to occur with a reduced likelihood of interference relative to a static configuration. By enabling the full duplex operation to occur, the wireless node may reduce an overhead associated with beam sweeping communication by using full duplex operation when available.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
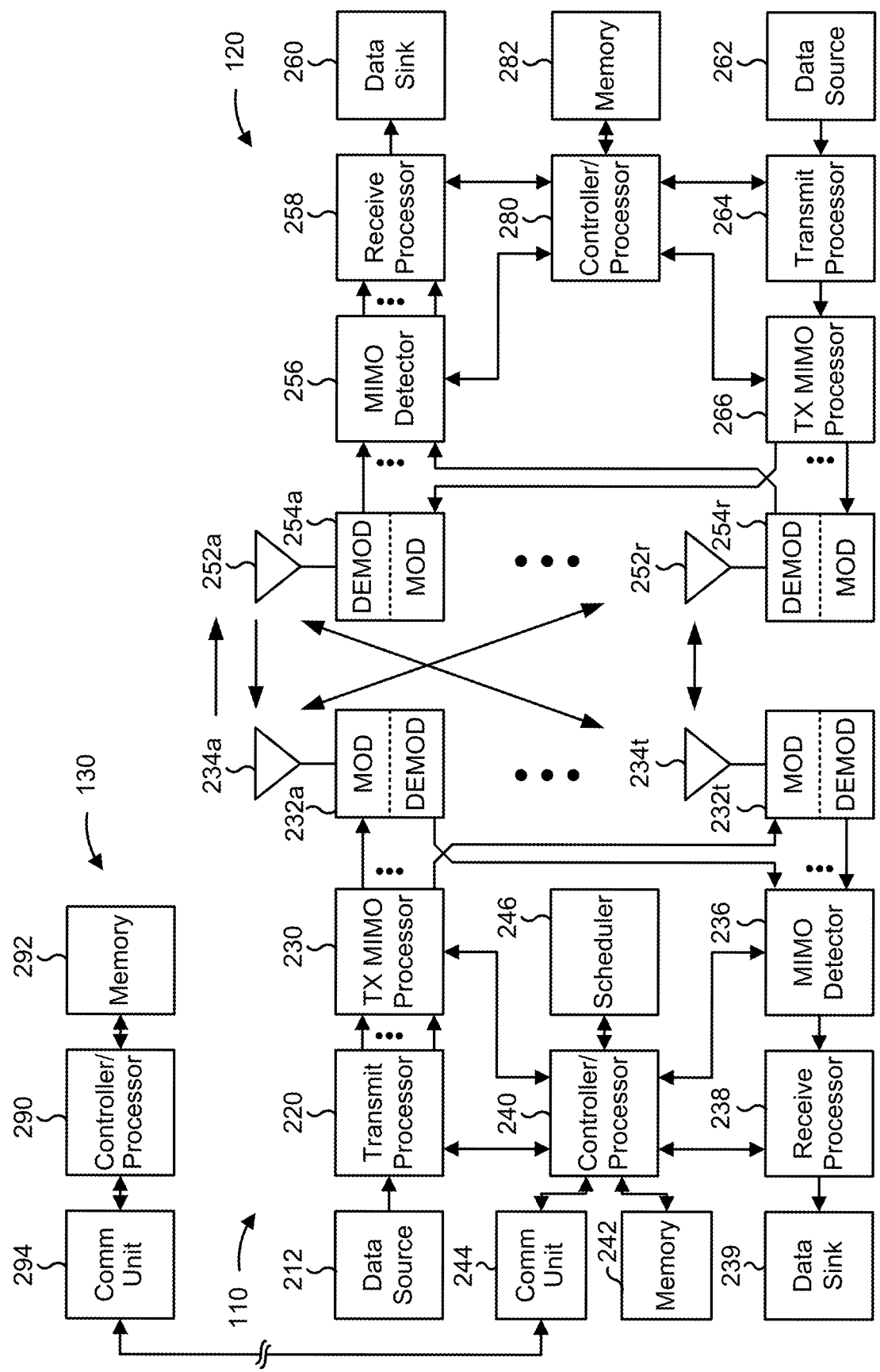
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with beam sweep configuration for full-duplex-capable wireless nodes, as described in more detail elsewhere herein. For example, controller/processor 240 of base station 110, controller/processor 280 of UE 120, or any other component(s) of FIG. 2 may perform or direct operations of, for example, the process of FIG. 7, the process of FIG. 8, or other processes as described herein. Memories 242 and 282 may store data and program codes for base station 110 and UE 120, respectively. A scheduler 246 may schedule UEs for data transmission on the downlink or uplink.

In some aspects, a wireless communication device, such as a base station 110 or a UE 120, may include means for determining a full duplex capability of a wireless node for a particular beam pair, means for selecting a beam sweep configuration for full duplex communications based at least in part on the full duplex capability of the wireless node for the particular beam pair, means for causing communication to occur using the particular beam pair in accordance with the beam sweep configuration based at least in part on selecting the beam sweep configuration, among other examples, or combinations thereof. In some aspects, such means may include one or more components of base station 110 or UE 120 described in connection with FIG. 2.

Figure 3:
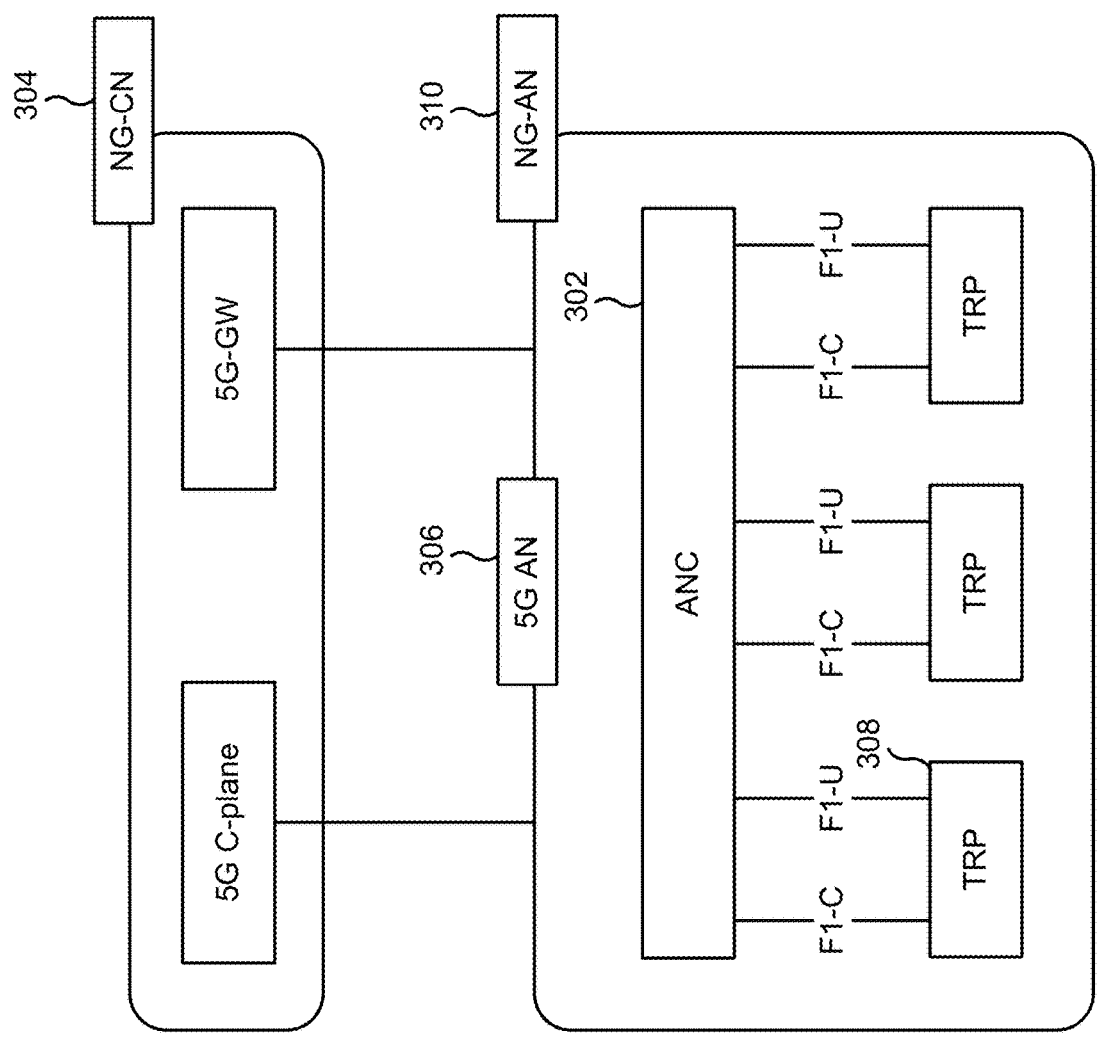
FIG. 3 illustrates an example logical architecture of a distributed radio access network (RAN) in accordance with various aspects of the present disclosure.

FIG. 3 illustrates an example logical architecture of a distributed radio access network (RAN) in accordance with various aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, gNB, or some other term). As described above, "TRP" may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of the RAN may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 310 may support dual connectivity with NR. NG-AN 310 may share a common fronthaul for LTE and NR.

The architecture may enable cooperation between and among TRPs 308. For example, cooperation may be preset within a TRP or across TRPs via the ANC 302. In some aspects, no inter-TRP interface may be needed/present.

In some aspects, a dynamic configuration of split logical functions may be present within the architecture of the RAN. The packet data convergence protocol (PDCP), radio link control (RLC), and MAC protocol layers may be adaptably placed at the ANC or TRP.

Figure 4:
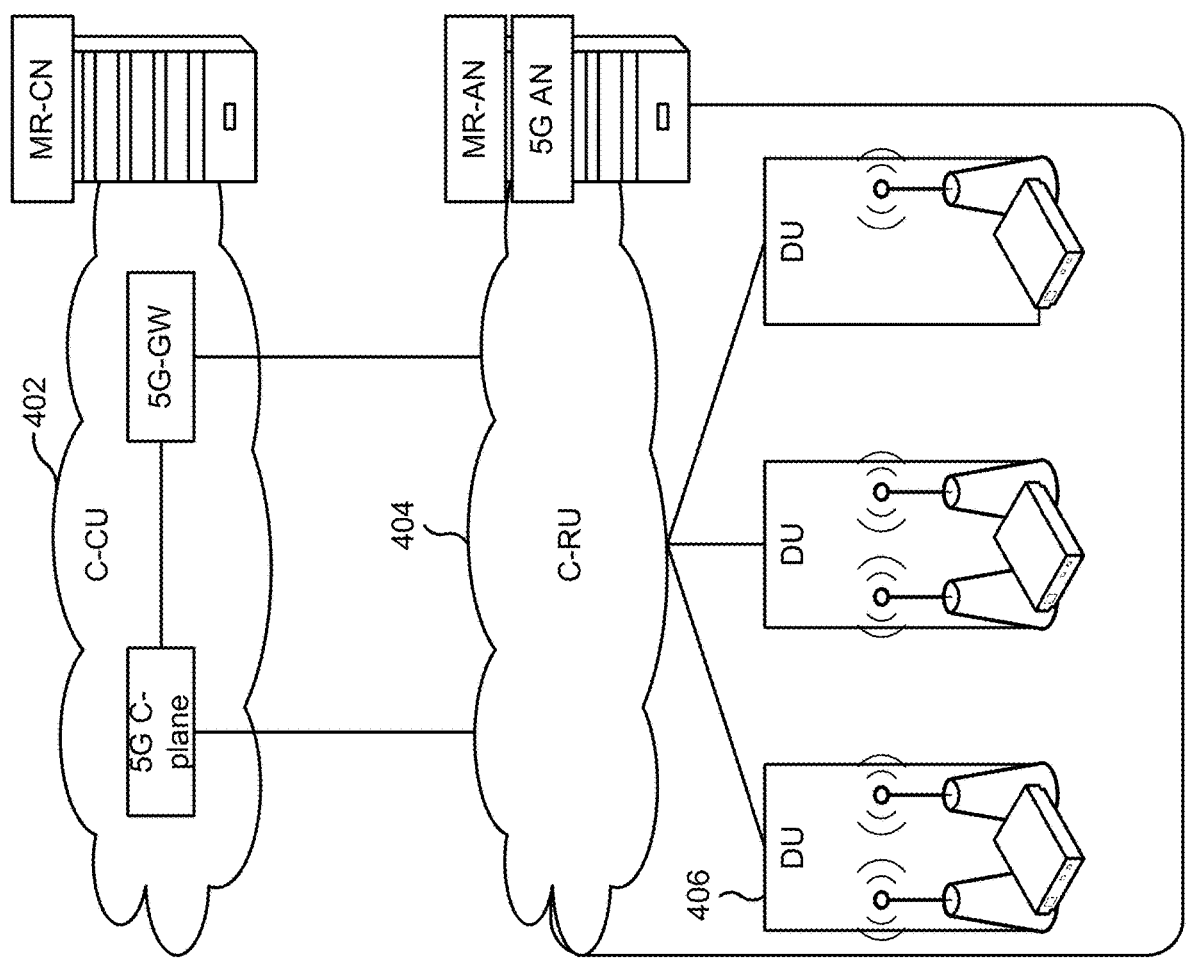
FIG. 4 illustrates an example physical architecture of a distributed RAN in accordance with various aspects of the present disclosure.

FIG. 4 illustrates an example physical architecture of a distributed RAN in accordance with various aspects of the present disclosure. A centralized core network unit (C-CU) 402 may host core network functions. The C-CU may be centrally deployed. C-CU functionality may be offloaded (for example, to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5A:
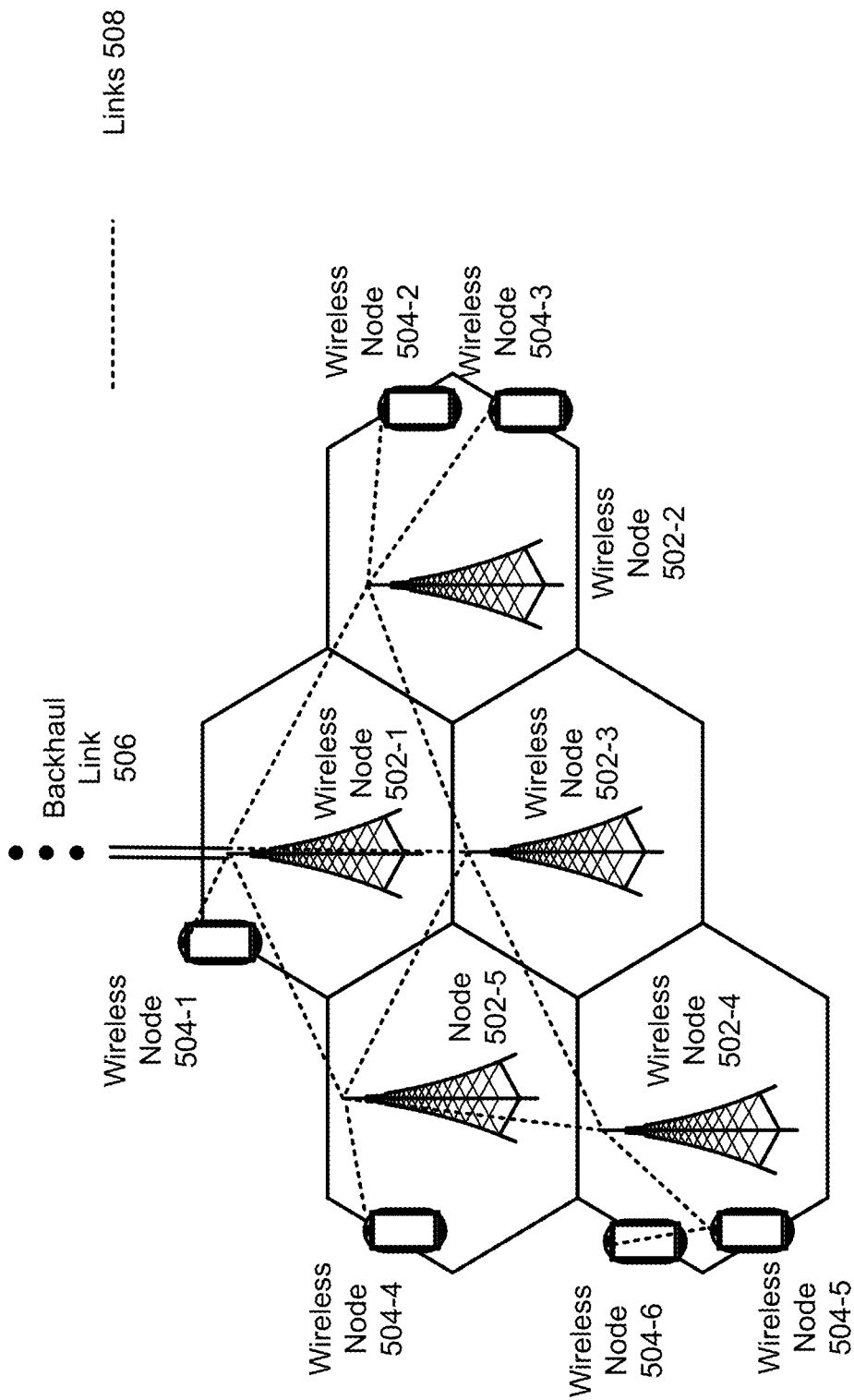
FIGS. 5A-5C are diagrams illustrating an example of a network topology for a network, in accordance with various aspects of the present disclosure.
Figure 5B:
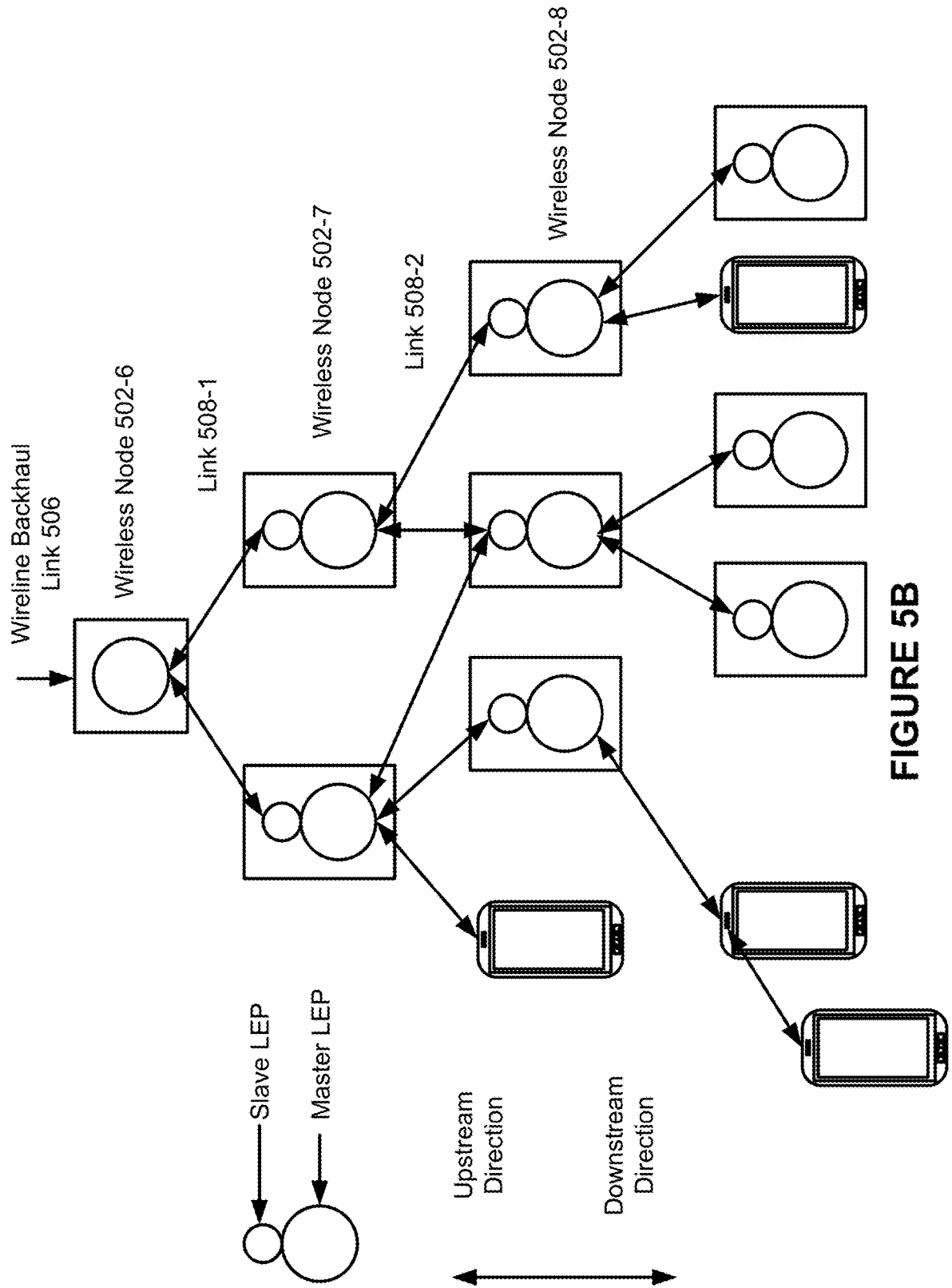
Figure 5C:
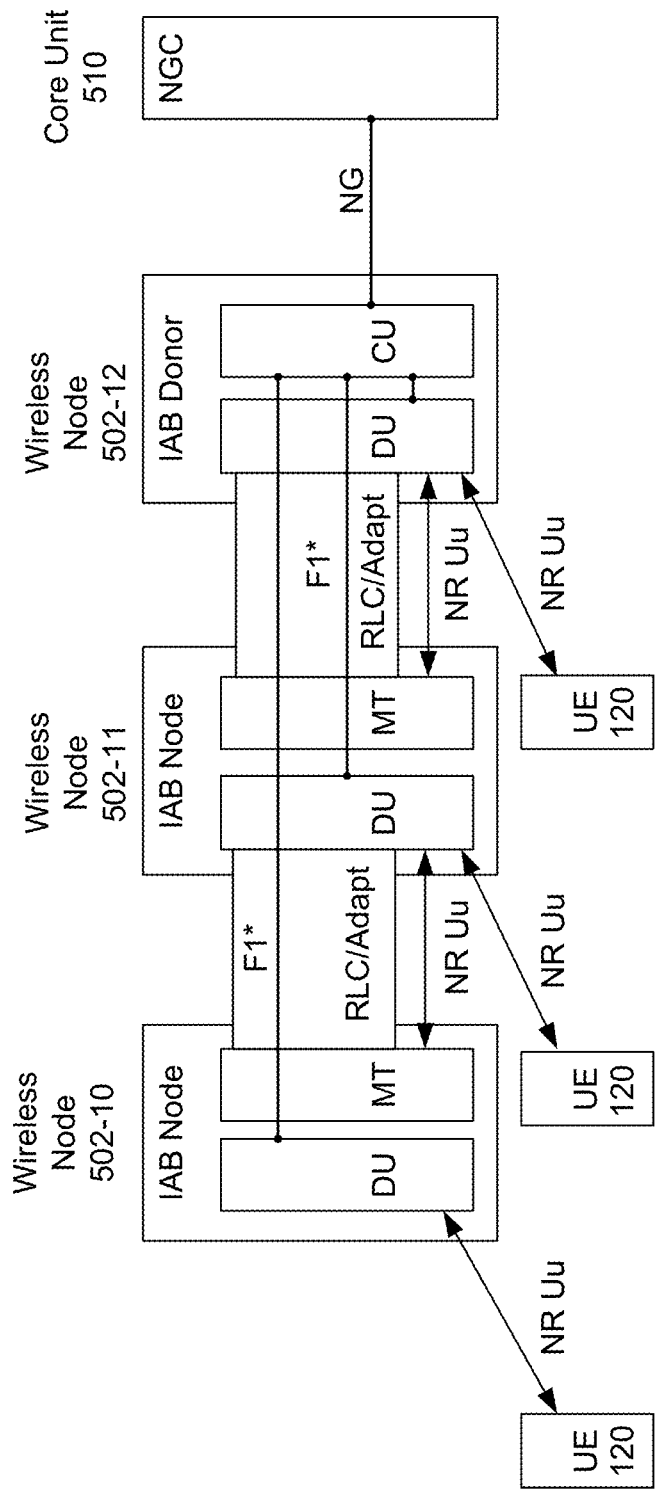

FIGS. 5A-5C are diagrams illustrating an example of a network topology for a multi-link network, in accordance with various aspects of the present disclosure. Self-backhauling or integrated access/backhaul (IAB) may be deployed to use a common set of resources for access traffic and backhaul traffic. For example, a first node (a BS 110, a UE 120, among other examples) may communicate backhaul traffic via first mmWave resources with a second node, and may communicate access traffic via second mmWave resources with a third node. In some aspects, the second node and the third node may be the same node. For example, the first node may communicate traffic via first mmWave resources and second mmWave resources. Although some aspects, described herein, are described in terms of an IAB deployment, some aspects described herein may be used in connection with other types of multi-hop networks.

As shown in FIG. 5A, example 500 may include multiple wireless nodes 502 (BSs) and multiple wireless nodes 504

(UEs). At least one wireless node (wireless node 502-1) may communicate with a core network via a backhaul link 506, such as a fiber connection, a wireless backhaul connection, among other examples. Wireless nodes 502 and 504 may communicate with each other using a set of links 508, such as a set of mmWave links; a 3G, 4G, 5G, etc. air interface; among other examples.

As further shown in FIG. 5A, one or more wireless nodes 502 or 504 may communicate indirectly via one or more other wireless nodes 502 or 504. For example, data may be transferred from a core network to wireless node 504-6 via backhaul link 506, a link 508 between wireless node 502-1 and wireless node 502-5, a link 508 between wireless node 502-5 and wireless node 502-4, a link 508 between wireless node 502-4 and wireless node 504-5, and a link 508 between wireless node 504-5 and wireless node 504-6. In some aspects, multiple different paths may be used to communicate data between wireless nodes 502 or 504. For example, wireless node 502-5 may communicate with wireless node 502-4 via a single link 508 between wireless node 502-5 and wireless node 502-4 (a direct link) or via a first link 508 between wireless node 502-5 and wireless node 502-3 and a second link between wireless node 502-3 and wireless node 502-4 (an indirect link).

As shown in FIG. 5B, wireless nodes 502 and wireless nodes 504 can be arranged in a hierarchical topology to enable management of network resources. Each link 508 may be associated with a master link end point (master LEP) and a slave link end point (slave LEP), which may define a hierarchy between wireless nodes 502 or 504. For example, wireless node 502-6 may communicate with wireless node 502-7 via link 508-1. In such examples, wireless node 502-6 is associated with a master link end point and wireless node 502-7 is associated with a slave link end point for link 508-1, which may define wireless node 502-6 as hierarchically superior to wireless node 502-7, and wireless node 502-7 as hierarchically inferior to wireless node 502-6 with reference to link 508-1. In such examples, wireless node 502-6 may be termed a master wireless node or a parent wireless node and wireless node 502-7 may be termed a slave wireless node or a child wireless node. Moreover, wireless node 502-6 may be defined as upstream relative to wireless node 502-7 (and wireless node 502-7 may be defined as downstream relative to wireless node 502-6).

Similarly, wireless node 502-7 includes a master link end point for link 508-2 and wireless node 502-8 includes a slave link end point for link 508-2. In such examples, wireless node 502-7 is hierarchically superior and upstream to wireless node 502-8, and wireless node 502-8 is hierarchically inferior and downstream to wireless node 502-7 with reference to link 508-2. In such examples, wireless node 502-7 may be termed the master wireless node or the parent wireless node and wireless node 502-8 may be termed the slave wireless node or the child wireless node.

As shown in FIG. 5C, a set of interfaces may be illustrated for a set of wireless nodes 502 in a hierarchical topology. In such examples, wireless node 502-10 (a first IAB wireless node) may be hierarchically inferior to wireless node 502-11 (a second IAB wireless node), and may be hierarchically inferior to wireless node 502-12 (an IAB donor). Similarly, wireless node 502-11 may be hierarchically inferior to wireless node 502-12.

In some aspects, an IAB wireless node may be a wireless node that relays traffic to or from an anchor through one or more hops (one or more other wireless nodes). In some aspects, an IAB donor may be a wireless node that is associated with a wireline connection to a core network. For example, wireless node 502-12 may include a CU that includes an NG interface connecting the CU to a core unit 510 (a Next Gen core (NGC) unit), which may be a wireless node of the core network.

In some aspects, wireless node 502-12 may communicate with wireless nodes 502-10 and 502-11 via another interface. For example, the CU of wireless node 502-12 may include F1 interfaces to respective DUs of wireless nodes 502-10 and 502-11. Additionally or alternatively, a DU of wireless node 502-12 (which may be a master link end point) may include an NR Uu interface to an MT (which may be a slave link end point for the NR Uu interface) of wireless node 502-11 and a radio link control adapt-type channel (RLC/adapt) interface to the MT of wireless node 502-11. Additionally or alternatively, the DU of wireless node 502-12 may include one or more other interfaces, such as an NR Uu interface to a UE 120 (a wireless node 504), among other examples.

In some aspects, wireless node 502-11 may communicate using one or more other interfaces. For example, a DU of wireless node 502-11 may include an NR Uu interface to an MT of wireless node 502-10, an RLC/adapt interface to the MT of wireless node 502-11, an NR Uu interface to a UE 120, among other examples.

In full duplex operation, a wireless communication device or wireless node (for example, a UE, a BS, an IAB node, among other examples) may concurrently transmit and receive using the same frequency or frequency band. For example, a wireless node may transmit a first beam to a parent wireless node on a particular frequency and concurrently receive a second beam from a child wireless node on the particular frequency. Similarly, the wireless node may receive a first beam from the parent wireless node and concurrently transmit a second beam to the child wireless node. Full duplex operation may reduce overhead, improve capability, reduce latency, among other examples associated with beam sweeping. The wireless node may use full duplex operation for, for example, for synchronization signal block (SSB) transmissions, RMSI transmissions, system information block (SIB) transmissions, random access channel (RACH) transmissions, channel state information reference signal (CSI-RS) transmissions, sounding reference signal (SRS) transmissions, among other examples.

As an example, a wireless node may receive and measure a first set of SSBs, such as a cell defining SSB (CD-SSB), a radio resource management SSB (RRM-SSB), among other examples, from a parent wireless node, and concurrently transmit, using beam sweeping, a second set of SSBs to a child wireless node. Additionally or alternatively, the wireless node may transmit a CSI-RS or an RMSI transmission to the child wireless node concurrently with measuring or searching for the first set of SSBs from the parent wireless node. Similarly, a wireless node may transmit a RACH transmission to a parent wireless node and concurrently scan for one or more RACH transmissions from one or more child wireless nodes, UEs, or other wireless nodes. As another example, a wireless node may transmit a first SRS, such as a periodic SRS, to a parent wireless node and concurrently receive a second SRS, such as another periodic SRS, from a child wireless node. Additionally or alternatively, the wireless node may transmit a RACH transmission to the parent wireless node and concurrently receive the second SRS from the child wireless node. Additionally or alternatively, the wireless node may, in full duplex operation, transmit or receive a set of other types of signals in two different directions, such as to a parent wireless node and from a child wireless node or vice versa.

Full duplex capabilities may change over time. For example, a wireless node may support full duplex communications on a particular frequency and for a particular beam pair at a first time, but may not support full duplex communications on the particular frequency for the particular beam pair at a second time. This may be related to device capabilities of the wireless communication device, changing channel conditions, changing link budgets, changing transmit or receive power configurations, changing geography (such as when a wireless communication device is moving or communicating with another wireless communication device that is moving), among other examples. Moreover, the wireless node may support full duplex communications for some beam pairs but not for other beam pairs. For example, the wireless node may support full duplex communications using a first beam pair of a transmit beam q and a receive beam r, but may not support full duplex communications for a second beam pair of a transmit beam s and receive beam t. This may be based at least in part on a reflector being positioned such that the transmit beam s is reflected back towards an antenna that is to receive the receive beam t. Additionally or alternatively, this may be based at least in part on a first antenna associated with the transmit beam s and a second antenna associated with the receive beam t being on the same antenna panel and the wireless node not having full duplex capability for concurrent transmission and reception within the same antenna panel (but having full duplex capability for paired beams and corresponding paired antennas on different antenna panels).

Some aspects described herein enable beam sweep configuration for full-duplex-capable wireless nodes. For example, a wireless node may determine whether full duplex communications are supported for a particular beam pair and may select a beam sweep configuration for full duplex communications based at least in part on whether full duplex communications are supported. In such examples, the beam sweep configuration may relate to a beam width, a beam shape, a beam direction, a beam order, a set of resources selected for transmission or reception, a periodicity for beam sweeping, a transmit or receive power, among other examples. At a subsequent time, the wireless node may update the beam sweep configuration based at least in part on whether full duplex communications are still supported for the particular beam pair or whether full duplex communications are supported for one or more other beam pairs. In this way, the wireless node may enable full duplex operation for beam sweeping communications while adapting to changing conditions associated with the full duplex operation.

Figure 6A:
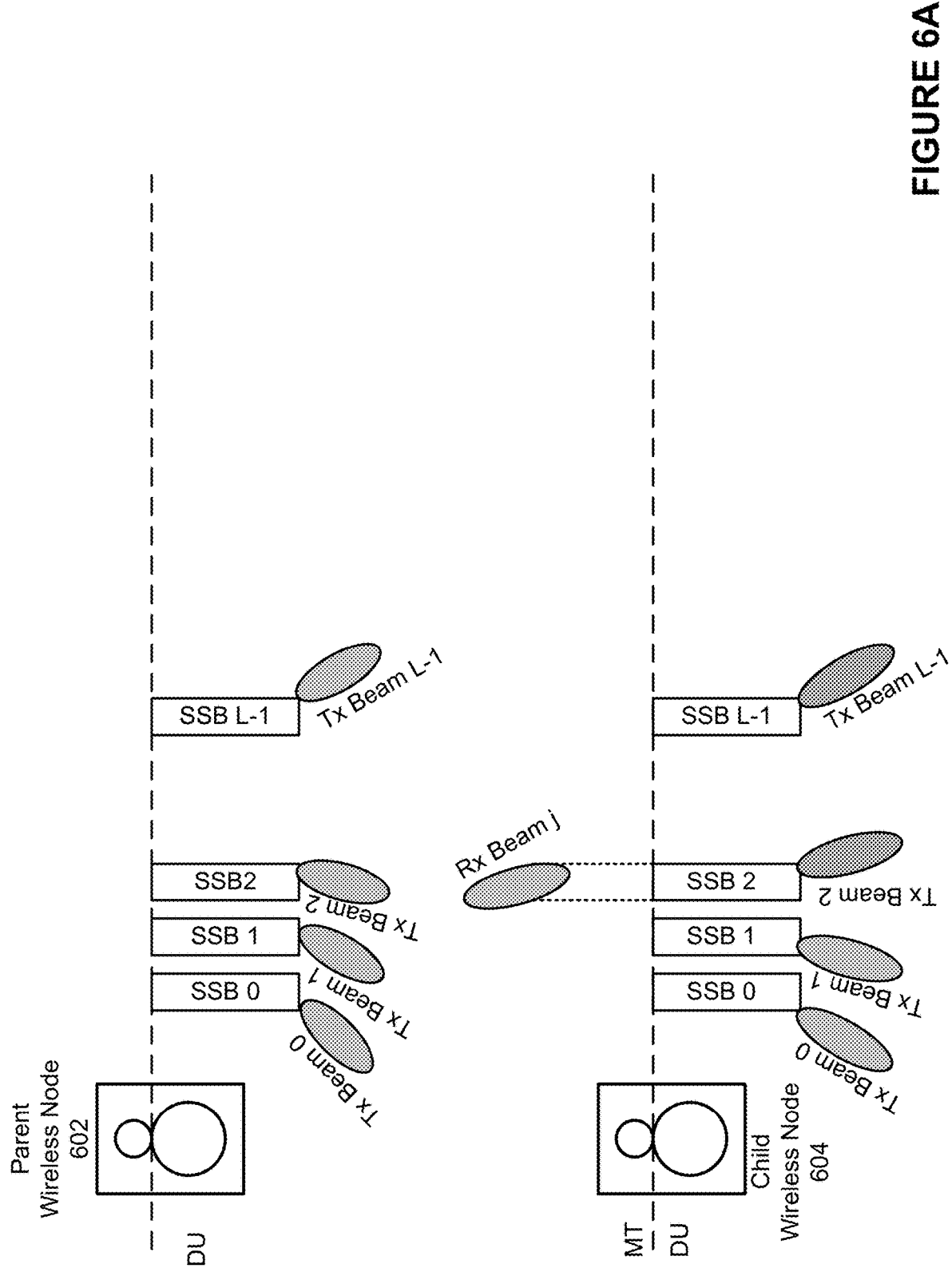
FIGS. 6A-6C are diagrams illustrating an example of a beam sweep configuration for full-duplex-capable wireless nodes in accordance with various aspects of the present disclosure.
Figure 6B:
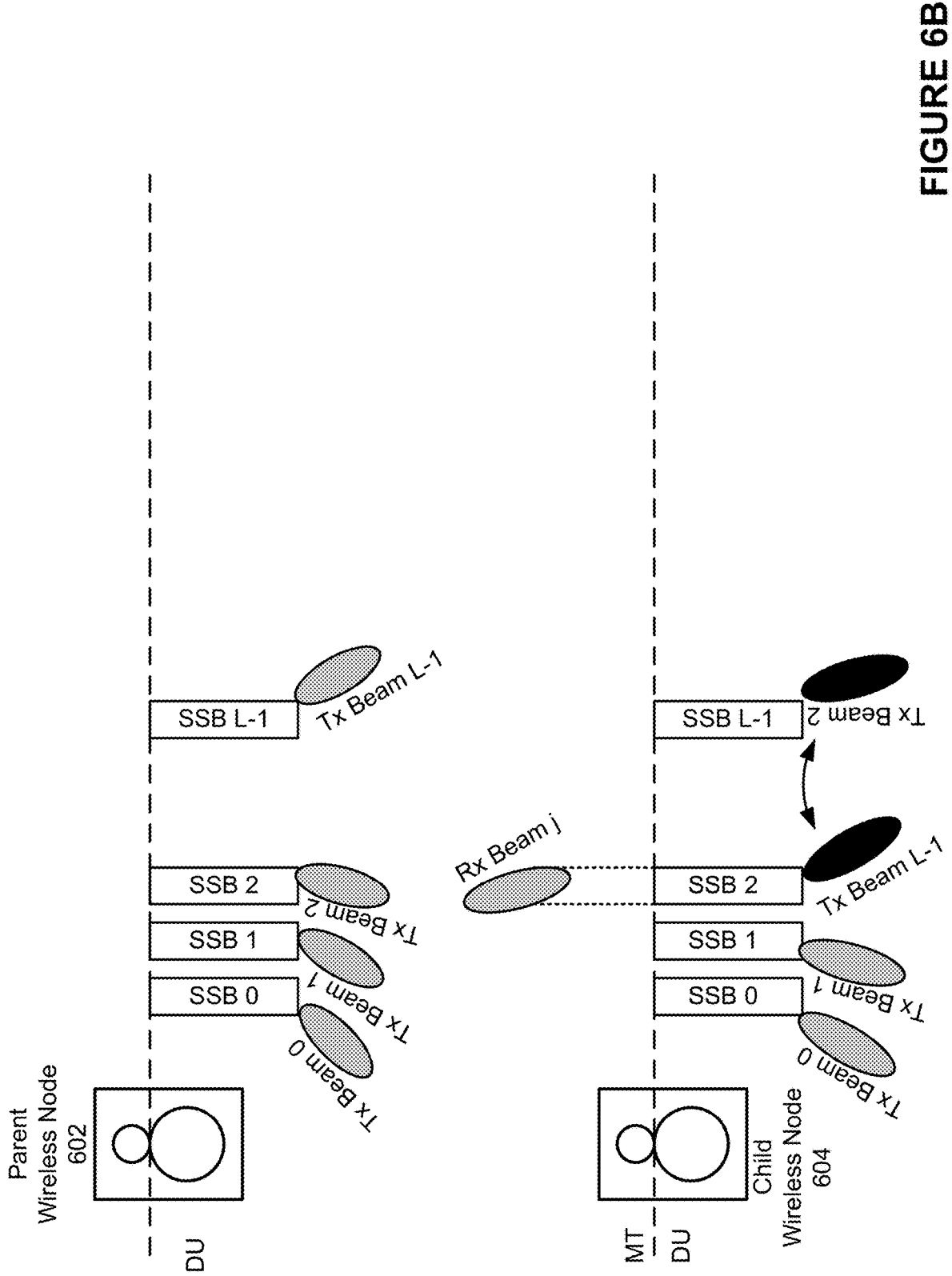
Figure 6C:
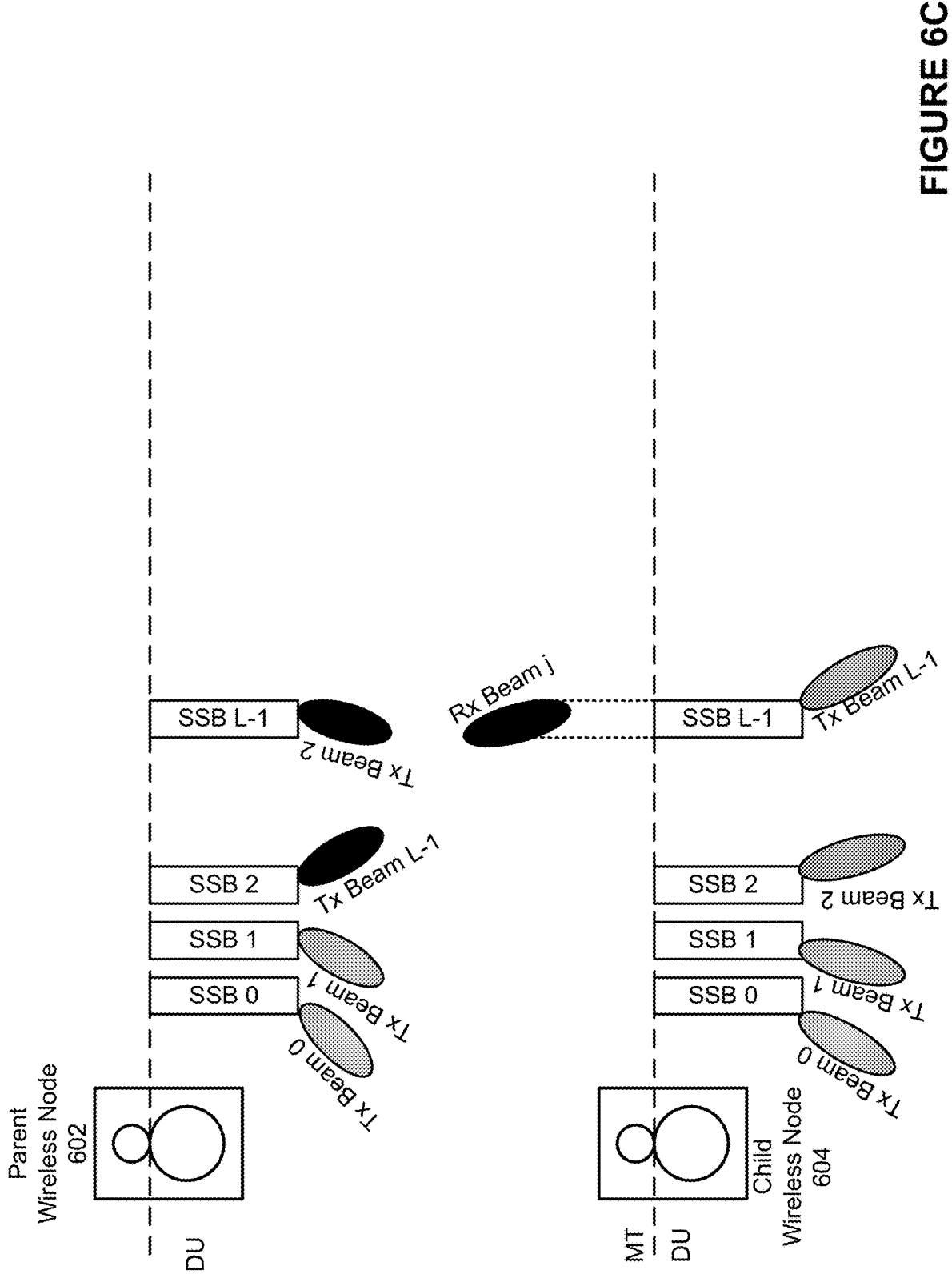

FIGS. 6A-6C are diagrams illustrating example beam sweep configurations for full-duplex-capable wireless nodes in accordance with various aspects of the present disclosure. As shown in FIGS. 6A-6C a parent wireless node 602 (that includes a DU) may be in communication with a child wireless node 604 (that includes an MT and a DU). Although some aspects are described in terms of a parent wireless node and a child wireless node, other arrangements of wireless nodes are possible, as described above.

As further shown in FIG. 6A, at a first time, parent wireless node 602 may perform beam sweeping to transmit a set of SSBs on a set of L transmit (Tx) beams 0 through L−1. Similarly, child wireless node 604 may be configured to perform beam sweeping to transmit another set of SSBs on another set of L Tx beams 0 through L−1. Although some aspects are described in terms of a set of SSBs, other signaling may be possible for beam sweeping, such as RMSI signaling, SIB type 1 (SIB1) signaling, RACH signaling, CSI-RS signaling, or SRS signaling among other examples.

In some aspects, child wireless node 604 may measure or track an SSB transmission by parent wireless node 602. For example, child wireless node 604 may measure a Tx beam 2 conveying an SSB 2 using a receive (Rx) beam j. In such examples, child wireless node 604 may determine that child wireless node 604 is capable of full duplex communication on a beam pair consisting of Rx beam j and Tx beam 2 and may enable full duplex communication on the beam pair. For example, child wireless node 604 may receive the SSB 2 from parent wireless node 602 and may transmit an SSB 2 on Tx beam 2 to a child wireless node of child wireless node 604.

As further shown in FIG. 6B, at a second time, child wireless node 604 may determine that a full duplex capability for the beam pair of Rx beam j and Tx beam 2 has changed. For example, child wireless node 604 may detect a threshold level of interference associated with Rx beam j or may receive an indication of a threshold level of interference associated with Tx beam 2. Additionally or alternatively, child wireless node 604 may determine to reevaluate whether full duplex operation is allowable or suitable for, for example, Rx beam j and Tx beam 2 based at least in part on expiration of a timer. For example, child wireless node 604 may periodically select a new beam sweeping configuration to avoid poor performance associated with changing channel conditions. Additionally or alternatively, child wireless node 604 may detect a change to channel conditions, such as a presence of another wireless node communicating on a frequency or frequency band, a change to a transmit power of parent wireless node 602, among other examples.

In some aspects, child wireless node 604 may select a different beam sweeping configuration. For example, child wireless node 604 may determine to switch Tx beam 2 and Tx beam L−1, such that child wireless node 604 transmits SSB 2 using Tx beam L−1 and SSB L−1 using Tx beam 2. In such examples, child wireless node 604 may determine that a beam pair of Rx beam j and Tx beam L−1 is allowable or suitable for full duplex operation. In some aspects, the beam sweeping configuration may include a set of parameters, such as a beam width, a beam direction, a beam order, among other examples. For example, child wireless node 604 may determine to change a beam shape to reduce interference, such as by suppressing side-lobes in a direction from which interference is caused. Additionally or alternatively, child wireless node 604 may set, for the beam sweeping configuration, a set of resources that are to be used for beam sweeping. For example, child wireless node 604 may select, from an available set of SSB location candidates, a subset of SSB location candidates in which to transmit an SSB within an SSB burst set. Additionally or alternatively, child wireless node 604 may set a periodicity for beam sweeping, a transmit power or a receive power for monitoring for Rx beam j and transmitting Tx beam L−1, respectively. In this way, child wireless node 604 enables full duplex operation with a reduced likelihood of interference relative to a static full duplex operation configuration. In some aspects, child wireless node 604 may select the beam sweeping configuration from a set of beam sweeping configurations. For example, child wireless node 604 may store a set of beam sweeping configurations including a set of possible beam pairings, beam shapes, transmit powers, receive powers, among other examples. Additionally or alternatively, child wireless node 604 may receive, from parent wireless node 602 information identifying a set of beam sweeping configurations that may be used for full duplex operation.

In some aspects, child wireless node 604 may determine the beam sweeping configuration for itself. For example, child wireless node 604 may determine its full duplex capability and set the beam sweeping configuration accordingly. Additionally or alternatively, child wireless node 604 may receive information identifying the beam sweeping configuration from another wireless node. For example, parent wireless node 602 or a central unit may determine the full duplex capability of child wireless node 604 and may transmit signaling identifying a corresponding beam sweeping configuration to child wireless node 604. In such examples, parent wireless node 602 may determine the beam sweeping configuration based at least in part on receiving a request from child wireless node 604. For example, child wireless node 604 may detect a threshold level of interference when operating in full duplex using a first beam sweeping configuration and may transmit a request to parent wireless node 602 to cause parent wireless node 602 to select a second beam sweeping configuration to mitigate the threshold level of interference. In such examples, parent wireless node 602 or child wireless node 604 may use remaining minimum system information (RMSI) broadcast signaling on a Uu interface, downlink control information (DCI) signaling, medium access control (MAC) control element (CE) signaling, radio resource control (RRC) signaling, F1-AP interface signaling, among other examples to convey information identifying a beam sweeping configuration. The request may identify, for example, a synchronization signal block (SSB) for which a failure of the first beam sweeping configuration is detected. A failure may include, for example, detection a threshold level of interference on the SSB.

In some aspects, child wireless node 604 may report one or more measurements to parent wireless node 602 or use one or more measurements when selecting the beam sweeping configuration. Additionally or alternatively, child wireless node 604 or parent wireless node 602 may use measurements performed by one or more other devices. For example, child wireless node 604 may use a measurement performed by parent wireless node 602 or by a child wireless node of child wireless node 604, among other examples, to select a beam sweeping configuration for full duplex operation. The measurement may include, for example, a reference signal received power (RSRQ) measurement, a receives signal strength indicator (RSSI) measurement, a signal to noise ratio (SNR) measurement, a signal to interference and noise ratio (SINR) measurement, or a self-interference measurement, among other examples. In some aspects, child wireless node 604 may modify a receive component, a transmit component, or both the receive component and the transmit component, among other examples, of the beam sweeping configuration. For example, child wireless node 604 may change the beam sweeping configuration for links to child wireless nodes of child wireless node 604, but may avoid changing a configuration of a backhaul link to parent wireless node 602.

As further shown in FIG. 6C, at a third time, child wireless node 604 may determine that a full duplex capability for the beam pair of Rx beam j and Tx beam 2 has changed and does not support full duplex operation. In such examples, child wireless node 604 may request that parent wireless node 602 select a different beam sweeping configuration. For example, child wireless node 604 may transmit a MAC CE that includes information requesting that parent wireless node 602 select a different beam sweeping configuration. In some aspects, child wireless node 604 may include, in the MAC CE, information identifying the beam sweep configuration. For example, child wireless node 604 may include information requesting that parent wireless node 602 transmit a particular SSB using a particular beam. Additionally or alternatively, child wireless node 604 may transmit a request that parent wireless node 602 select the beam sweeping configuration. In such examples, the parent wireless node 602 may select the beam sweeping configuration itself. As shown, based at least in part on selecting a beam sweeping configuration, parent wireless node 602 may switch Tx beam 2 and Tx beam L−1. Further, child wireless node 604 may receive SSB 2 using Rx beam j and may transmit SSB L−1 using Tx beam L−1 concurrently in full duplex.

Figure 7:
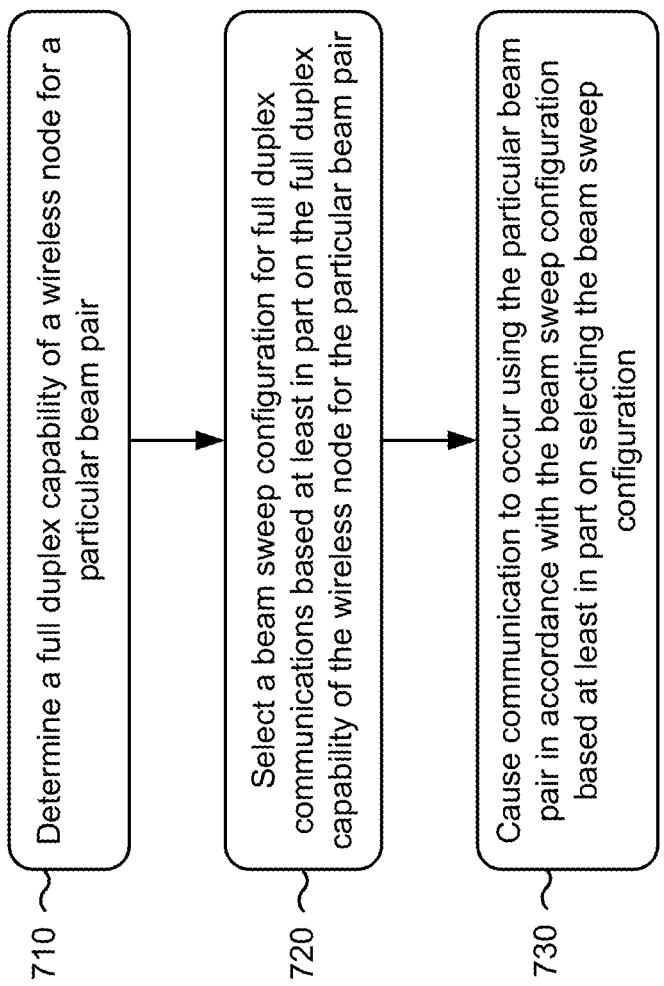
FIG. 7 is a flowchart illustrating an example process performed by a wireless communication device for a beam sweep configuration for full-duplex-capable wireless nodes in accordance with various aspects of the present disclosure.

FIG. 7 is a flowchart illustrating an example process performed, for example, by a wireless communication device in accordance with various aspects of the present disclosure. The example process is an example in which a wireless communication device (for example, BS 110, UE 120, wireless nodes 502 and 504, parent wireless node 602, child wireless node 604, among other examples) performs operations relating to beam sweep configuration for full-duplex-capable wireless nodes.

As shown in FIG. 7, in some aspects, the process may include determining a full duplex capability of a wireless node for a particular beam pair (block 710). For example, the UE (using controller/processor 240, controller/process 280, among other examples) may determine a full duplex capability of a wireless node for a particular beam pair, as described above.

As shown in FIG. 7, in some aspects, the process may include selecting a beam sweep configuration for full duplex communications based at least in part on the full duplex capability of the wireless node for the particular beam pair (block 720). For example, the UE (using controller/processor 240, controller/process 280, among other examples) may select a beam sweep configuration for full duplex communications based at least in part on the full duplex capability of the wireless node for the particular beam pair, as described above.

As shown in FIG. 7, in some aspects, the process may include causing communication to occur using the particular beam pair in accordance with the beam sweep configuration based at least in part on selecting the beam sweep configuration (block 730). For example, the UE (using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, among other examples) may cause communication to occur using the particular beam pair in accordance with the beam sweep configuration based at least in part on selecting the beam sweep configuration, as described above.

The process may include additional aspects, such as any single aspect or any combination of aspects described below or in connection with one or more other processes described elsewhere herein.

In a first aspect, selecting the beam sweep configuration includes selecting, for at least one of an uplink beam or a downlink beam, at least one of a beam width, a beam shape, a beam direction, or a beam order.

In a second aspect, alone or in combination with the first aspect, selecting the beam sweep configuration includes selecting, for at least one of an uplink beam or a downlink beam, one or more resources allocated for the full duplex communications.

In a third aspect, alone or in combination with one or more of the first and second aspects, selecting the beam sweep configuration includes selecting, for at least one of an uplink beam or a downlink beam, a periodicity for beam sweeping.

In a fourth aspect, alone or in combination with one or more of the first through third aspects, selecting the beam sweep configuration includes selecting, for at least one of an uplink beam or a downlink beam, at least one of a transmit power or a receive power for the full duplex communications.

In a fifth aspect, alone or in combination with one or more of the first through fourth aspects, the wireless communication device is at least one of the wireless node, a parent wireless node of the wireless node, a child wireless node of the wireless node, another wireless node, or a central unit.

In a sixth aspect, alone or in combination with one or more of the first through fifth aspects, the wireless communication device is a parent wireless node of the wireless node, and the process includes receiving a request to select the beam sweep configuration from the wireless node and selecting the beam sweep configuration includes selecting the beam sweep configuration for the wireless node or the parent wireless node based at least in part on receiving the request from the wireless node.

In a seventh aspect, alone or in combination with one or more of the first through sixth aspects, the process includes receiving a report of a measurement of an uplink or downlink signal and selecting the beam sweep configuration includes selecting the beam sweep configuration based at least in part on the measurement.

In an eighth aspect, alone or in combination with one or more of the first through seventh aspects, the process includes performing a measurement of one or more uplink or downlink signals, and selecting the beam sweep configuration includes selecting the beam sweep configuration based at least in part on the measurement.

In a ninth aspect, alone or in combination with one or more of the first through eighth aspects, selecting the beam sweep configuration includes selecting the beam sweep configuration for at least one of a transmit component of the full duplex communications, a receive component of the full duplex communications, or a combination thereof.

In a tenth aspect, alone or in combination with one or more of the first through ninth aspects, the process includes transmitting signaling identifying the beam sweep configuration to at least one of: a parent node of the wireless node, a child node of the wireless node, another wireless node, or a central unit.

In an eleventh aspect, alone or in combination with one or more of the first through tenth aspects, the signaling includes at least one of a remaining minimum system information broadcast signal, a downlink control information, a medium access control element, a radio resource control message, or an F1-AP interface message.

In a twelfth aspect, alone or in combination with one or more of the first through eleventh aspects, selecting the beam sweep configuration includes changing the beam sweep configuration from a first beam sweep configuration to a second beam sweep configuration.

In a thirteenth aspect, alone or in combination with one or more of the first through twelfth aspects, the communication is at least one of a synchronization signal block communication, a remaining minimum system information communication, a random access channel communication, a channel state information reference signal communication, or a sounding reference signal communication.

In a fourteenth aspect, alone or in combination with one or more of the first through thirteenth aspects, a request to select the beam sweep configuration indicates a failure associated with a first beam sweep configuration to trigger a selection of a second beam sweep configuration as the beam sweep configuration.

In a fifteenth aspect, alone or in combination with one or more of the first through fourteenth aspects, a request to select the beam sweep configuration includes a synchronization signal block index associated with the failure.

In a sixteenth aspect, alone or in combination with one or more of the first through fifteenth aspects, wherein a request to select the beam sweep configuration is included in an uplink control message, and wherein the uplink control message is one of a medium access control (MAC) control element, a radio resource control message, or an uplink control information.

In a seventeenth aspect, alone or in combination with one or more of the first through sixteenth aspects, the process includes determining that the wireless node is configured for full duplex operation and selecting the beam sweep configuration based at least in part on determining that the wireless node is configured for full duplex operation.

In an eighteenth aspect, alone or in combination with one or more of the first through seventeenth aspects, the process includes determining a change to the full duplex capability for the particular beam pair and selecting a new beam sweep configuration, that is different from a current beam sweep configuration, for the particular beam pair based at least in part on determining the change to the full duplex capability for the particular beam pair.

In a nineteenth aspect, alone or in combination with one or more of the first through eighteenth aspects, a measurement, based at least in part on which the beam sweep configuration is selected, is at least one of: a reference signal received power measurement, a received signal strength indicator measurement, a signal to noise ratio measurement, a signal to interference and noise ratio measurement, or a self-interference measurement.

In a twentieth aspect, alone or in combination with one or more of the first through nineteenth aspects, a measurement, based at least in part on which the beam sweep configuration is selected, is of one or more beams at a parent node or a child node of the wireless communication device.

In a twenty-first aspect, alone or in combination with one or more of the first through twentieth aspects, the wireless communication device is a parent wireless node, and the process includes determining the full duplex capability of a child wireless node.

In a twenty-second aspect, alone or in combination with one or more of the first through twenty-first aspects, the wireless communication device is a parent wireless node, and the process includes selecting the beam sweep configuration for at least one of the parent wireless node or a child wireless node.

Figure 8:
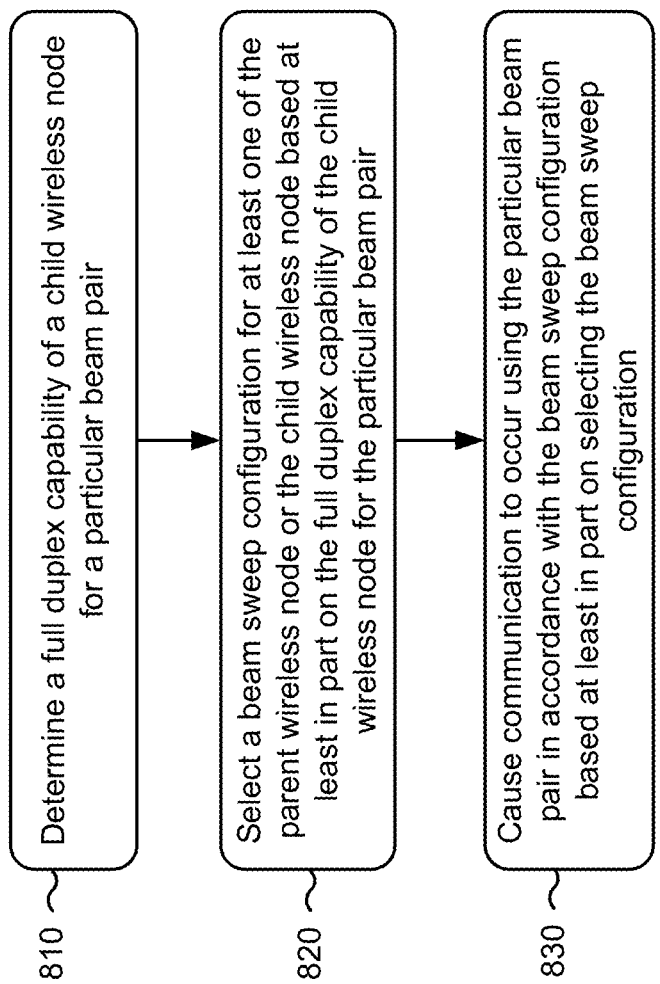
FIG. 8 is a flowchart illustrating an example process performed by a wireless node for a beam sweep configuration for full-duplex-capable wireless nodes in accordance with various aspects of the present disclosure.

FIG. 8 is a flowchart illustrating an example process performed, for example, by a wireless communication device in accordance with various aspects of the present disclosure. The example process is an example in which a parent wireless node (for example, BS 110, UE 120, wireless nodes 502 and 504, parent wireless node 602, among other examples) performs operations relating to beam sweep configuration for full-duplex-capable wireless nodes.

As shown in FIG. 8, in some aspects, the process may include determining a full duplex capability of a child wireless node for a particular beam pair (block 810). For example, the parent wireless node (using controller/processor 240, controller/process 280, among other examples) may determine a full duplex capability of a child wireless node for a particular beam pair, as described above.

As further shown in FIG. 8, in some aspects, the process may include selecting a beam sweep configuration for at least one of the parent wireless node or the child wireless node based at least in part on the full duplex capability of the child wireless node for the particular beam pair (block 820). For example, the parent wireless node (using controller/processor 240, controller/process 280, among other examples) may select a beam sweep configuration for at least one of the parent wireless node or the child wireless node based at least in part on the full duplex capability of the child wireless node for the particular beam pair, as described above.

As further shown in FIG. 8, in some aspects, the process may include causing communication to occur using the particular beam pair in accordance with the beam sweep configuration based at least in part on selecting the beam sweep configuration (block 830). For example, the parent wireless node (using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, among other examples) may cause communication to occur using the particular beam pair in accordance with the beam sweep configuration based at least in part on selecting the beam sweep configuration, as described above.

The process may include additional aspects, such as any single aspect or any combination of aspects described below or in connection with one or more other processes described elsewhere herein.

In a first aspect, selecting the beam sweep configuration includes selecting the beam sweep configuration for the parent wireless node to communicate with the child wireless node, the child wireless node is communicating in full duplex operation.

In a second aspect, alone or in combination with the first aspect, selecting the beam sweep configuration includes selecting the beam sweep configuration for the child wireless node to communicate with the parent wireless node and another wireless node that is a child of the child wireless node.

In a third aspect, alone or in combination with one or more of the first and second aspects, the process includes receiving a request to select the beam sweep configuration and selecting the beam sweep configuration based at least in part on receiving the request.

In a fourth aspect, alone or in combination with one or more of the first through third aspects, receiving the request includes receiving the request from the child wireless node or a central unit.

In a fifth aspect, alone or in combination with one or more of the first through fourth aspects, selecting the beam sweep configuration comprises selecting, for at least one of an uplink beam or a downlink beam, at least one of: a beam width, a beam shape, a beam direction, or a beam order.

In a sixth aspect, alone or in combination with one or more of the first through fifth aspects, selecting the beam sweep configuration comprises selecting, for at least one of an uplink beam or a downlink beam, one or more resources allocated for the full duplex communications.

In a seventh aspect, alone or in combination with one or more of the first through sixth aspects, selecting the beam sweep configuration comprises selecting, for at least one of an uplink beam or a downlink beam, a periodicity for beam sweeping.

In an eighth aspect, alone or in combination with one or more of the first through seventh aspects, selecting the beam sweep configuration includes selecting, for at least one of an uplink beam or a downlink beam, at least one of a transmit power or a receive power for the full duplex communications.

In a ninth aspect, alone or in combination with one or more of the first through eighth aspects, the process includes selecting the beam sweep configuration includes selecting the beam sweep configuration based at least in part on the measurement.

In a tenth aspect, alone or in combination with one or more of the first through ninth aspects, the process includes receiving a report of a measurement of an uplink or downlink signal selecting the beam sweep configuration comprises selecting the beam sweep configuration based at least in part on the measurement.

In an eleventh aspect, alone or in combination with one or more of the first through tenth aspects, selecting the beam sweep configuration includes selecting the beam sweep configuration for at least one of a transmit component of the full duplex communications, a receive component of the full duplex communications, or a combination thereof.

In a twelfth aspect, alone or in combination with one or more of the first through eleventh aspects, the process includes transmitting signaling identifying the beam sweep configuration to at least one of: the child wireless node, a child node of the child wireless node, another wireless node, or a central unit.

In a thirteenth aspect, alone or in combination with one or more of the first through twelfth aspects, the signaling includes at least one of: a remaining minimum system information broadcast signal, a downlink control information, a medium access control element, a radio resource control message, or an F1-AP interface message.

In a fourteenth aspect, alone or in combination with one or more of the first through thirteenth aspects, selecting the beam sweep configuration includes changing the beam sweep configuration from a first beam sweep configuration to a second beam sweep configuration.

In a fifteenth aspect, alone or in combination with one or more of the first through fourteenth aspects, the communication is at least one of a synchronization signal block communication, a remaining minimum system information communication, a random access channel communication, a channel state information reference signal communication, or a sounding reference signal communication.

Figure 9:
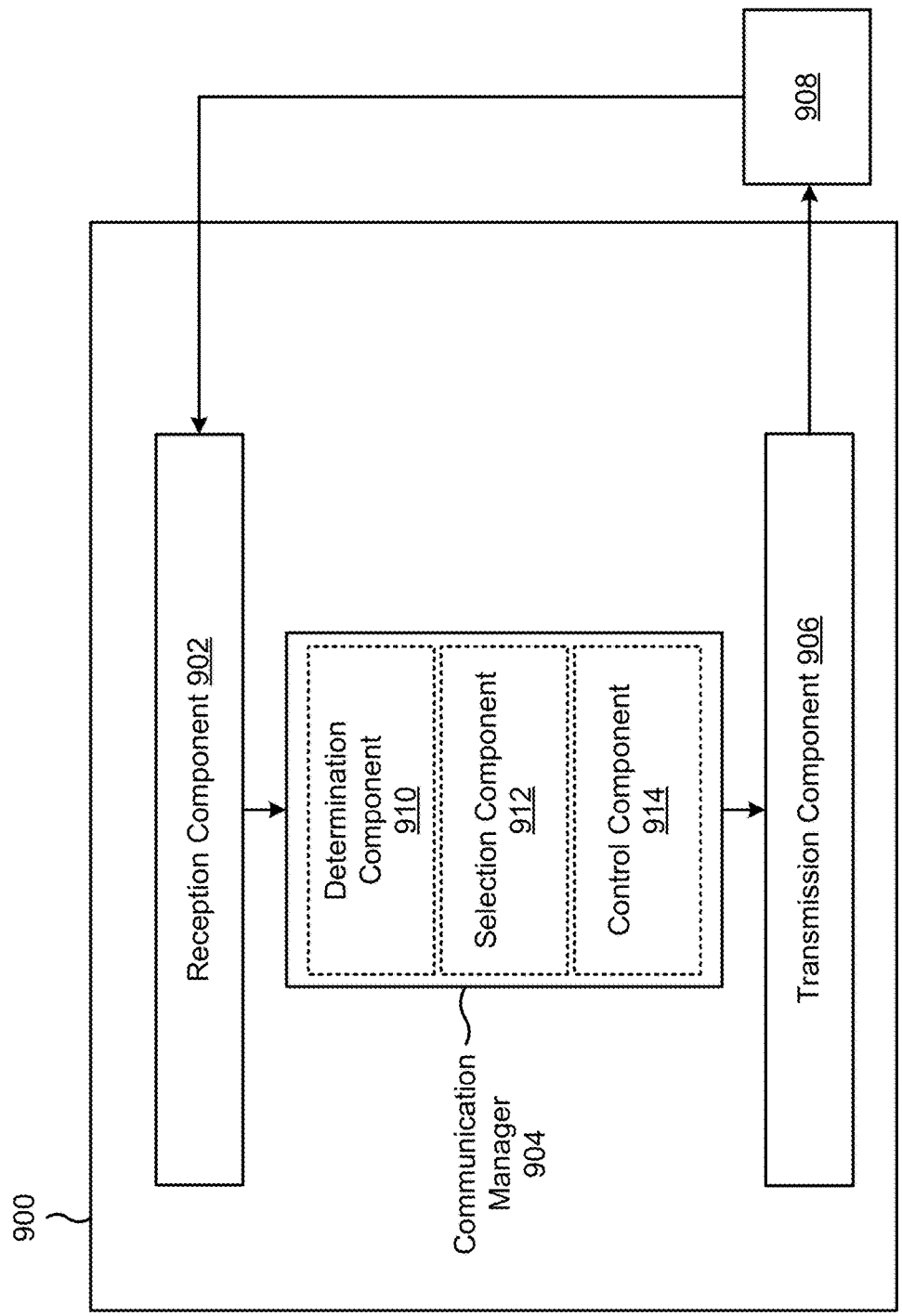
FIGS. 9 and 10 are block diagrams of example apparatuses for wireless communication, in accordance with various aspects of the present disclosure.

FIG. 9 is a block diagram of an example apparatus 900 for wireless communication in accordance with various aspects of the present disclosure. The apparatus 900 may be a wireless communication device, or a wireless communication device may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 6A-6C. Additionally or alternatively, the apparatus 900 may be configured to perform one or more processes described herein, such as the process of FIG. 7, among other examples. In some aspects, the apparatus 900 may include one or more components of the wireless communication device described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the wireless communication device described above in connection with FIG. 2. In some aspects, the transmission component 906 may be co-located with the reception component 902 in a transceiver.

The communication manager 904 may determine a full duplex capability of a wireless node for a particular beam pair. The communication manager 904 may select a beam sweep configuration for full duplex communications based at least in part on the full duplex capability of the wireless node for the particular beam pair. The communication manager 904 may cause communication to occur using the particular beam pair in accordance with the beam sweep configuration based at least in part on selecting the beam sweep configuration. In some aspects, the communication manager 904 may perform one or more operations described elsewhere herein as being performed by one or more components of the communication manager 904.

The communication manager 904 may include a controller/processor, a memory, a scheduler, a communication unit, or a combination thereof, of the wireless communication device described above in connection with FIG. 2. In some aspects, the communication manager 904 includes a set of components, such as a determination component 910, a selection component 912, a control component 914, or a combination thereof. Alternatively, the set of components may be separate and distinct from the communication manager 904. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 910 may determine a full duplex capability of a wireless node for a particular beam pair. The selection component 912 may select a beam sweep configuration for full duplex communications based at least in part on the full duplex capability of the wireless node for the particular beam pair. The control component 914 may cause communication to occur using the particular beam pair in accordance with the beam sweep configuration based at least in part on selecting the beam sweep configuration.

The reception component 902 may receive a report of a measurement of an uplink or downlink signal, wherein selecting the beam sweep configuration comprises selecting the beam sweep configuration based at least in part on the measurement.

The reception component 902 may perform a measurement of one or more uplink or downlink signals, wherein selecting the beam sweep configuration comprises selecting the beam sweep configuration based at least in part on the measurement.

The transmission component 906 may transmit signaling identifying the beam sweep configuration to at least one of: a parent node of the wireless node, a child node of the wireless node, another wireless node, or a central unit.

Figure 10:
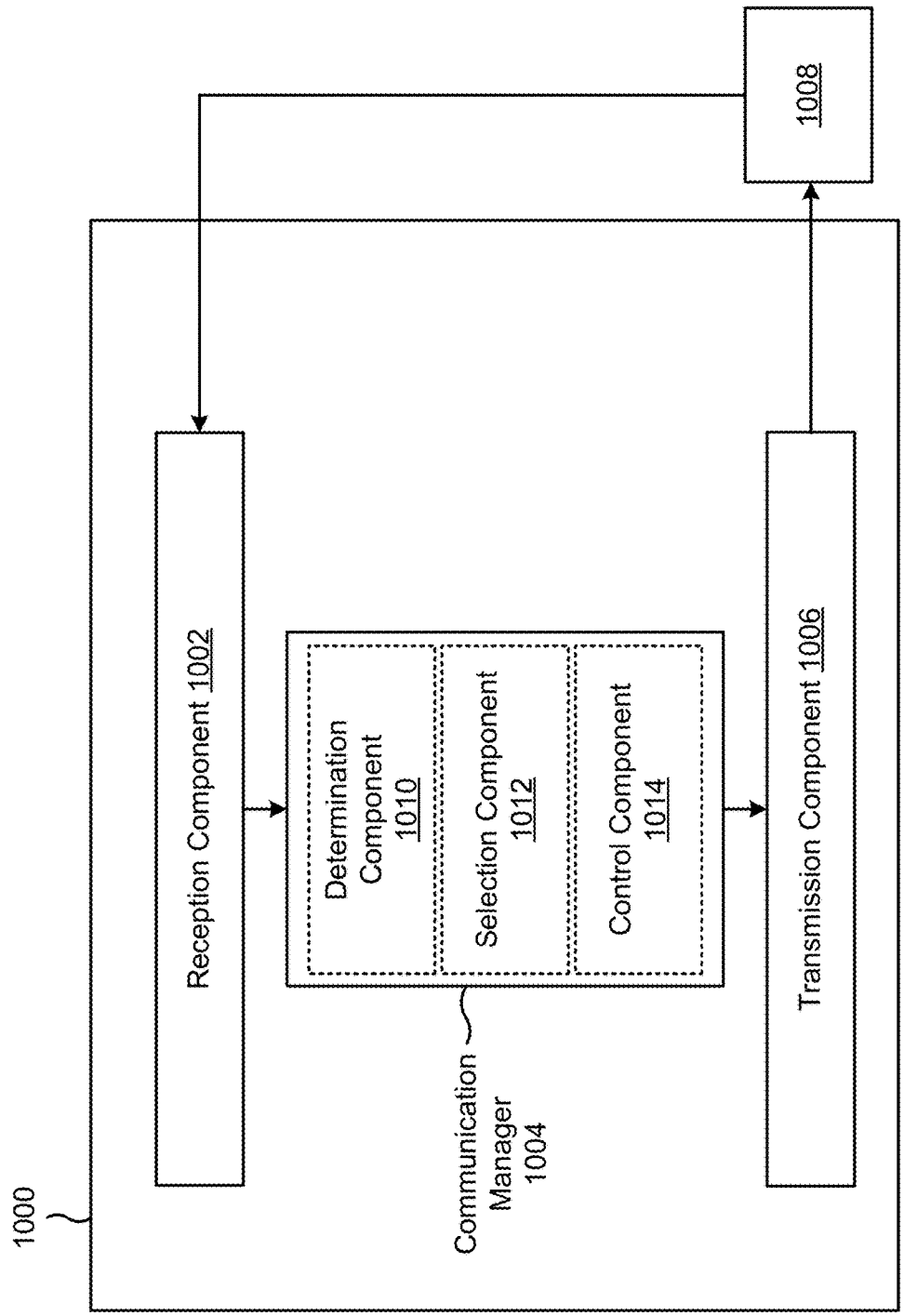

FIG. 10 is a block diagram of an example apparatus 1000 for wireless communication in accordance with various aspects of the present disclosure. The apparatus 1000 may be a parent wireless node, or a parent wireless node may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 6A-6C. Additionally or alternatively, the apparatus 1000 may be configured to perform one or more processes described herein, such as the process of FIG. 8, among other examples. In some aspects, the apparatus 1000 may include one or more components of the parent wireless node described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the parent wireless node described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the parent wireless node described above in connection with FIG. 2. In some aspects, the transmission component 1006 may be co-located with the reception component 1002 in a transceiver.

The communication manager 1004 may determine a full duplex capability of a child wireless node for a particular beam pair. The communication manager 1004 may select a beam sweep configuration for at least one of the parent wireless node or the child wireless node based at least in part on the full duplex capability of the child wireless node for the particular beam pair. The communication manager 1004 may cause communication to occur using the particular beam pair in accordance with the beam sweep configuration based at least in part on selecting the beam sweep configuration. In some aspects, the communication manager 1004 may perform one or more operations described elsewhere herein as being performed by one or more components of the communication manager 1004.

The communication manager 1004 may include a controller/processor, a memory, a scheduler, a communication unit, or a combination thereof, of the parent wireless node described above in connection with FIG. 2. In some aspects, the communication manager 1004 includes a set of components, such as a determination component 1010, a selection component 1012, a control component 1014, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the parent wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1010 may determine a full duplex capability of a child wireless node for a particular beam pair. The selection component 1012 may select a beam sweep configuration for at least one of the parent wireless node or the child wireless node based at least in part on the full duplex capability of the child wireless node for the particular beam pair. The control component 1014 may cause communication to occur using the particular beam pair in accordance with the beam sweep configuration based at least in part on selecting the beam sweep configuration.

The reception component 1002 may receive a request to select the beam sweep configuration selecting the beam sweep configuration based at least in part on receiving the request.

The reception component 1002 may receive a report of a measurement of an uplink or downlink signal, wherein selecting the beam sweep configuration comprises selecting the beam sweep configuration based at least in part on the measurement.

The reception component 1002 may perform a measurement of one or more uplink or downlink signals, wherein selecting the beam sweep configuration comprises selecting the beam sweep configuration based at least in part on the measurement.

The transmission component 1006 may transmit signaling identifying the beam sweep configuration to at least one of: the child wireless node, a child node of the child wireless node, another wireless node, or a central unit.

The following provides an overview of aspects of the present disclosure:

Aspect 1: A method of wireless communication performed by a wireless communication device, comprising: determining a full duplex capability of a wireless node for a particular beam pair; selecting a beam sweep configuration for full duplex communications based at least in part on the full duplex capability of the wireless node for the particular beam pair; and causing communication to occur using the particular beam pair in accordance with the beam sweep configuration based at least in part on selecting the beam sweep configuration.

Aspect 2: The method of aspect 1, wherein selecting the beam sweep configuration comprises selecting, for at least one of an uplink beam or a downlink beam, at least one of: a beam width, a beam shape, a beam direction, or a beam order.

Aspect 3: The method of any of aspects 1 to 2, wherein selecting the beam sweep configuration comprises selecting, for at least one of an uplink beam or a downlink beam, one or more resources allocated for the full duplex communications.

Aspect 4: The method of any of aspects 1 to 3, wherein selecting the beam sweep configuration comprises selecting, for at least one of an uplink beam or a downlink beam, a periodicity for beam sweeping.

Aspect 5: The method of any of aspects 1 to 4, wherein selecting the beam sweep configuration comprises selecting, for at least one of an uplink beam or a downlink beam, at least one of a transmit power or a receive power for the full duplex communications.

Aspect 6: The method of any of aspects 1 to 5, wherein the wireless communication device is at least one of: the wireless node, a parent wireless node of the wireless node, a child wireless node of the wireless node, another wireless node, or a central unit.

Aspect 7: The method of any of aspects 1 to 6, wherein the wireless communication device is a parent wireless node of the wireless node; further comprising receiving a request to select the beam sweep configuration from the wireless node; and wherein selecting the beam sweep configuration comprises selecting the beam sweep configuration for the wireless node or the parent wireless node based at least in part on receiving the request from the wireless node.

Aspect 8: The method of any of aspects 1 to 7, further comprising receiving a report of a measurement of an uplink or downlink signal; and wherein selecting the beam sweep configuration comprises selecting the beam sweep configuration based at least in part on the measurement.

Aspect 9: The method of any of aspects 1 to 7, further comprising performing a measurement of one or more uplink or downlink signals; and wherein selecting the beam sweep configuration comprises selecting the beam sweep configuration based at least in part on the measurement.

Aspect 10: The method of any of aspects 1 to 9, wherein selecting the beam sweep configuration comprises selecting the beam sweep configuration for at least one of a transmit component of the full duplex communications, a receive component of the full duplex communications, or a combination thereof.

Aspect 11: The method of any of aspects 1 to 10, further comprising transmitting signaling identifying the beam sweep configuration to at least one of: a parent node of the wireless node, a child node of the wireless node, another wireless node, or a central unit.

Aspect 12: The method of aspect 11, wherein the signaling includes at least one of: a remaining minimum system information broadcast signal, a downlink control information, a medium access control element, a radio resource control message, or an F1-AP interface message.

Aspect 13: The method of any of aspects 1 to 12, wherein selecting the beam sweep configuration comprises changing the beam sweep configuration from a first beam sweep configuration to a second beam sweep configuration.

Aspect 14: The method of any of aspects 1 to 13, wherein the communication is at least one of: a synchronization signal block communication, a remaining minimum system information communication, a random access channel communication, a channel state information reference signal communication, or a sounding reference signal communication.

Aspect 15: The method of any of aspects 1 to 14, wherein a request to select the beam sweep configuration indicates a failure associated with a first beam sweep configuration to trigger a selection of a second beam sweep configuration as the beam sweep configuration.

Aspect 16: The method of any of aspects 1 to 15, wherein a request to select the beam sweep configuration includes a synchronization signal block index associated with the failure.

Aspect 17: The method of any of aspects 1 to 16, wherein a request to select the beam sweep configuration is included in an uplink control message, and wherein the uplink control message is one of a medium access control (MAC) control element, a radio resource control message, or an uplink control information.

Aspect 18: The method of any of aspects 1 to 17, wherein the method includes determining that the wireless node is configured for full duplex operation and selecting the beam sweep configuration based at least in part on determining that the wireless node is configured for full duplex operation.

Aspect 19: The method of any of aspects 1 to 18, wherein the method includes determining a change to the full duplex capability for the particular beam pair and selecting a new beam sweep configuration, that is different from a current beam sweep configuration, for the particular beam pair based at least in part on determining the change to the full duplex capability for the particular beam pair.

Aspect 20: The method of any of aspects 1 to 19, wherein a measurement, based at least in part on which the beam sweep configuration is selected, is at least one of: a reference signal received power measurement, a received signal strength indicator measurement, a signal to noise ratio measurement, a signal to interference and noise ratio measurement, or a self-interference measurement.

Aspect 21: The method of any of aspects 1 to 20, wherein a measurement, based at least in part on which the beam sweep configuration is selected, is of one or more beams at a parent node or a child node of the wireless communication device.

Aspect 22: The method of any of aspects 1 to 21, wherein the wireless communication device is a parent wireless node, and the process includes determining the full duplex capability of a child wireless node.

Aspect 23: The method of any of aspects 1 to 22, wherein the wireless communication device is a parent wireless node, and the process includes selecting the beam sweep configuration for at least one of the parent wireless node or a child wireless node.

Aspect 24: A method of wireless communication performed by a parent wireless node, comprising: determining a full duplex capability of a child wireless node for a particular beam pair; selecting a beam sweep configuration for at least one of the parent wireless node or the child wireless node based at least in part on the full duplex capability of the child wireless node for the particular beam pair; and causing communication to occur using the particular beam pair in accordance with the beam sweep configuration based at least in part on selecting the beam sweep configuration.

Aspect 25: The method of aspect 24, wherein selecting the beam sweep configuration comprises selecting the beam sweep configuration for the parent wireless node to communicate with the child wireless node, wherein the child wireless node is communicating in full duplex operation.

Aspect 26: The method of any of aspects 24 to 25, wherein selecting the beam sweep configuration comprises selecting the beam sweep configuration for the child wireless node to communicate with the parent wireless node and another wireless node that is a child of the child wireless node.

Aspect 27: The method of any of aspects 24 to 26, further comprising receiving a request to select the beam sweep configuration; and selecting the beam sweep configuration based at least in part on receiving the request.

Aspect 28: The method of aspect 27, wherein receiving the request comprises receiving the request from the child wireless node or a central unit.

Aspect 29: The method of any of aspects 24 to 28, wherein selecting the beam sweep configuration comprises selecting, for at least one of an uplink beam or a downlink beam, at least one of: a beam width, a beam shape, a beam direction, or a beam order.

Aspect 30: The method of any of aspects 24 to 29, wherein selecting the beam sweep configuration comprises selecting, for at least one of an uplink beam or a downlink beam, one or more resources allocated for full duplex communications.

Aspect 31: The method of any of aspects 24 to 30, wherein selecting the beam sweep configuration comprises selecting, for at least one of an uplink beam or a downlink beam, a periodicity for beam sweeping.

Aspect 32: The method of any of aspects 24 to 31, wherein selecting the beam sweep configuration comprises selecting, for at least one of an uplink beam or a downlink beam, at least one of a transmit power or a receive power for full duplex communications.

Aspect 33: The method of any of aspects 24 to 32, further comprising receiving a report of a measurement of an uplink or downlink signal; and wherein selecting the beam sweep configuration comprises selecting the beam sweep configuration based at least in part on the measurement.

Aspect 34: The method of any of aspects 24 to 33, further comprising performing a measurement of one or more uplink or downlink signals; and wherein selecting the beam sweep configuration comprises selecting the beam sweep configuration based at least in part on the measurement.

Aspect 35: The method of any of aspects 24 to 34, wherein selecting the beam sweep configuration comprises selecting the beam sweep configuration for at least one of a transmit component of full duplex communications, a receive component of the full duplex communications, or a combination thereof.

Aspect 36: The method of any of aspects 24 to 35, further comprising transmitting signaling identifying the beam sweep configuration to at least one of: the child wireless node, a child node of the child wireless node, another wireless node, or a central unit.

Aspect 37: The method of aspect 36, wherein the signaling includes at least one of: a remaining minimum system information broadcast signal, a downlink control information, a medium access control element, a radio resource control message, or an F1-AP interface message.

Aspect 38: The method of any of aspects 24 to 37, wherein selecting the beam sweep configuration comprises changing the beam sweep configuration from a first beam sweep configuration to a second beam sweep configuration.

Aspect 39: The method of any of aspects 24 to 38, wherein the communication is at least one of: a synchronization signal block communication, a remaining minimum system information communication, a random access channel communication, a channel state information reference signal communication, or a sounding reference signal communication.

Aspect 40: An apparatus for wireless communication at a device, comprising a processor; memory coupled with the processor; and instructions stored in the memory and executable by the processor to cause the apparatus to perform the method of one or more aspects of aspects 1-23.

Aspect 41: A device for wireless communication, comprising a memory and one or more processors coupled to the memory, the memory and the one or more processors configured to perform the method of one or more aspects of aspects 1-23.

Aspect 42: An apparatus for wireless communication, comprising at least one means for performing the method of one or more aspects of aspects 1-23.

Aspect 43: A non-transitory computer-readable medium storing code for wireless communication, the code comprising instructions executable by a processor to perform the method of one or more aspects of aspects 1-23.

Aspect 44: A non-transitory computer-readable medium storing a set of instructions for wireless communication, the set of instructions comprising one or more instructions that, when executed by one or more processors of a device, cause the device to perform the method of one or more aspects of aspects 1-23.

Aspect 45: An apparatus for wireless communication at a device, comprising a processor; memory coupled with the processor; and instructions stored in the memory and executable by the processor to cause the apparatus to perform the method of one or more aspects of aspects 24-39.

Aspect 46: A device for wireless communication, comprising a memory and one or more processors coupled to the memory, the memory and the one or more processors configured to perform the method of one or more aspects of aspects 24-39.

Aspect 47: An apparatus for wireless communication, comprising at least one means for performing the method of one or more aspects of aspects 24-39.

Aspect 48: A non-transitory computer-readable medium storing code for wireless communication, the code comprising instructions executable by a processor to perform the method of one or more aspects of aspects 24-39.

Aspect 49: A non-transitory computer-readable medium storing a set of instructions for wireless communication, the set of instructions comprising one or more instructions that, when executed by one or more processors of a device, cause the device to perform the method of one or more aspects of aspects 24-39.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A wireless communication device for wireless communication, comprising:
a memory; and
one or more processors coupled to the memory, the one or more processors configured to:
determine a change to a full duplex capability of a wireless node for a first beam pair, wherein the change to the full duplex capability of the wireless node for the first beam pair comprises a change from supporting full duplex communications for the first beam pair at a first time to not supporting the full duplex communications for the first beam pair at a second time;
select a beam sweep configuration for the full duplex communications using a second beam pair based at least in part on the change to the full duplex capability of the wireless node for the first beam pair; and
cause communication to occur using the second beam pair in accordance with the beam sweep configuration based at least in part on selecting the beam sweep configuration.

2. The wireless communication device of claim 1, wherein the one or more processors, when configured to determine the change to the full duplex capability of the wireless node, are configured to determine that the wireless node is configured for full duplex operation; and
wherein the one or more processors, when configured to select the beam sweep configuration, are configured to select the beam sweep configuration based at least in part on determining that the wireless node is configured for full duplex operation.

3. The wireless communication device of claim 1, wherein the one or more processors are further configured to select a new beam sweep configuration, that is different from a current beam sweep configuration, for the first beam pair.

4. The wireless communication device of claim 1, wherein the one or more processors, when selecting the beam sweep configuration, are configured to select, for at least one of an uplink beam or a downlink beam of the second beam pair, at least one of: a beam width, a beam shape, a beam direction, or a beam order.

5. The wireless communication device of claim 1, wherein the one or more processors, when selecting the beam sweep configuration, are configured to select, for at least one of an uplink beam or a downlink beam of the second beam pair, at least one of one or more resources allocated for the full duplex communications, a periodicity for beam sweeping, or at least one of a transmit power or a receive power for the full duplex communications.

6. The wireless communication device of claim 1, wherein the wireless communication device is one of: the wireless node, a parent wireless node of the wireless node, a child wireless node of the wireless node, another wireless node, or a central unit.

7. The wireless communication device of claim 1, wherein the wireless communication device is a parent wireless node of the wireless node; and
wherein the one or more processors are further configured to receive a request to select the beam sweep configuration from the wireless node; and
wherein the one or more processors, when selecting the beam sweep configuration, are configured to select the beam sweep configuration for the wireless node or the parent wireless node based at least in part on receiving the request from the wireless node.

8. The wireless communication device of claim 7, wherein the request indicates a failure associated with a first beam sweep configuration to trigger a selection of a second beam sweep configuration as the beam sweep configuration.

9. The wireless communication device of claim 8, wherein the request includes a synchronization signal block index associated with the failure.

10. The wireless communication device of claim 7, wherein the request is included in a control message, and wherein the control message is one of a medium access control (MAC) control element, a radio resource control message, an F1-AP interface message, a downlink control information, or an uplink control information.

11. The wireless communication device of claim 1, wherein the one or more processors are further configured to receive a report of a measurement of an uplink or downlink signal; and
wherein the one or more processors, when selecting the beam sweep configuration, are configured to select the beam sweep configuration based at least in part on the measurement.

12. The wireless communication device of claim 11, wherein the measurement is at least one of: a reference signal received power measurement, a received signal strength indicator measurement, a signal to noise ratio measurement, a signal to interference and noise ratio measurement, or a self-interference measurement.

13. The wireless communication device of claim 11, wherein the measurement is of one or more beams at a parent node or a child node of the wireless communication device.

14. The wireless communication device of claim 1, wherein the one or more processors are further configured to perform a measurement of one or more uplink or downlink signals; and
wherein the one or more processors, when selecting the beam sweep configuration, are configured to select the beam sweep configuration based at least in part on the measurement.

15. The wireless communication device of claim 14, wherein the measurement is at least one of: a reference signal received power measurement, a received signal strength indicator measurement, a signal to noise ratio measurement, a signal to interference and noise ratio measurement, or a self-interference measurement.

16. The wireless communication device of claim 1, wherein the one or more processors are further configured to transmit signaling identifying the beam sweep configuration to at least one of: a parent node of the wireless node, a child node of the wireless node, another wireless node, or a central unit, and
wherein the signaling includes at least one of: a remaining minimum system information broadcast signal, a downlink control information, a medium access control element, a radio resource control message, or an F1-AP interface message.

17. The wireless communication device of claim 1, wherein the communication is at least one of: a synchronization signal block communication, a remaining minimum system information communication, a random access channel communication, a channel state information reference signal communication, or a sounding reference signal communication.

18. The wireless communication device of claim 1, wherein the wireless communication device is a parent wireless node, and
wherein the one or more processors, when determining the change to the full duplex capability, are configured to determine the change to the full duplex capability of a child wireless node.

19. The wireless communication device of claim 1, wherein the wireless communication device is a parent wireless node, and
wherein the one or more processors, when selecting the beam sweep configuration, are configured to select the beam sweep configuration for at least one of the parent wireless node or a child wireless node.

20. A method of wireless communication performed by a wireless communication device, comprising:
determining a change to a full duplex capability of a wireless node for a first beam pair, wherein the change to the full duplex capability of the wireless node for the first beam pair comprises a change from supporting full duplex communications for the first beam pair at a first time to not supporting the full duplex communications for the first beam pair at a second time;
selecting a beam sweep configuration for the full duplex communications using a second beam pair based at least in part on the change to the full duplex capability of the wireless node for the first beam pair; and
causing communication to occur using the second beam pair in accordance with the beam sweep configuration based at least in part on selecting the beam sweep configuration.

21. The method of claim 20, wherein determining the change to the full duplex capability of the wireless node comprises determining that the wireless node is configured for full duplex operation; and
wherein selecting the beam sweep configuration comprises selecting the beam sweep configuration based at least in part on determining that the wireless node is configured for full duplex operation.

22. The method of claim 20, further comprising selecting a new beam sweep configuration, that is different from a current beam sweep configuration, for the first beam pair.

23. The method of claim 20, wherein selecting the beam sweep configuration comprises selecting, for at least one of an uplink beam or a downlink beam of the second beam pair, at least one of: a beam width, a beam shape, a beam direction, or a beam order.

24. The method of claim 20, wherein selecting the beam sweep configuration comprises selecting, for at least one of an uplink beam or a downlink beam of the second beam pair, at least one of: one or more resources allocated for the full duplex communications, a periodicity for beam sweeping, or at least one of a transmit power or a receive power for the full duplex communications.

25. The method of claim 20, wherein the wireless communication device is a parent wireless node of the wireless node; and
further comprising receiving a request to select the beam sweep configuration from the wireless node; and
wherein selecting the beam sweep configuration comprises selecting the beam sweep configuration for the wireless node or the parent wireless node based at least in part on receiving the request from the wireless node.

26. The method of claim 25, wherein the request indicates a failure associated with a first beam sweep configuration to trigger a selection of a second beam sweep configuration as the beam sweep configuration.

27. The method of claim 26, wherein the request includes a synchronization signal block index associated with the failure.

28. The method of claim 25, wherein the request is included in a control message, and wherein the control message is one of a medium access control (MAC) control element, a radio resource control message, an F1-AP interface message, a downlink control information, or an uplink control information.

29. A non-transitory computer-readable medium storing a set of instructions for wireless communication, the set of instructions comprising:
one or more instructions that, when executed by one or more processors of a wireless communication device, cause the wireless communication device to:
determine a change to a full duplex capability of a wireless node for a first beam pair, wherein the change to the full duplex capability of the wireless node for the first beam pair comprises a change from supporting full duplex communications for the first beam pair at a first time to not supporting the full duplex communications for the first beam pair at a second time;
select a beam sweep configuration for the full duplex communications using a second beam pair based at least in part on the change to the full duplex capability of the wireless node for the first beam pair; and
cause communication to occur using the second beam pair in accordance with the beam sweep configuration based at least in part on selecting the beam sweep configuration.

30. An apparatus for wireless communication, comprising:
means for determining a change to a full duplex capability of a wireless node for a first beam pair, wherein the change to the full duplex capability of the wireless node for the first beam pair comprises a change from supporting full duplex communications for the first beam pair at a first time to not supporting the full duplex communications for the first beam pair at a second time;
means for selecting a beam sweep configuration for the full duplex communications using a second beam pair based at least in part on the change to the full duplex capability of the wireless node for the first beam pair; and
means for causing communication to occur using the second beam pair in accordance with the beam sweep configuration based at least in part on selecting the beam sweep configuration.

* * * * *